US012596027B2

(12) United States Patent

Hultmark et al.

(10) Patent No.: US 12,596,027 B2

(45) Date of Patent: Apr. 7, 2026

(54) DEVICE, SYSTEM, AND METHOD FOR FLUID MASS DETERMINATION

(71) Applicant: Tendo Technologies Inc., Princeton, NJ (US)

(72) Inventors: Marcus Hultmark, Princeton, NJ (US); Yuyang Fan, Princeton, NJ (US); Clay Byers, Princeton, NJ (US); Bayard G. Gardineer, Princeton, NJ (US)

(73) Assignee: TENDO TECHNOLOGIES, INC., Princeton, NJ (US)

( * ) Notice: Subject to any disclaimer, the term of this patent is extended or adjusted under 35 U.S.C. 154(b) by 0 days.

(21) Appl. No.: 18/416,360

(22) Filed: Jan. 18, 2024

(65) Prior Publication Data

US 2024/0401997 A1 Dec. 5, 2024

Related U.S. Application Data

(63) Continuation of application No. 18/386,057, filed on Nov. 1, 2023.

(Continued)

(51) Int. Cl.
*G01G 17/04* (2006.01)
*G01G 9/00* (2006.01)
(Continued)

(52) U.S. Cl.
CPC .............. *G01G 17/04* (2013.01); *G01G 9/00* (2013.01); *G01G 21/28* (2013.01); *G01G 23/48* (2013.01); *G01N 9/002* (2013.01); *G01N 29/036* (2013.01)

(58) Field of Classification Search
CPC .......... G01G 17/04; G01G 9/00; G01G 21/28; G01G 23/48
(Continued)

(56) References Cited

U.S. PATENT DOCUMENTS 4,811,595 A * 3/1989 Marciniak ............... G01F 22/02
73/290 V
5,261,274 A * 11/1993 Nemirow ................ G01F 17/00
324/668
(Continued)

FOREIGN PATENT DOCUMENTS

AT 17018 U1 * 2/2021 ............. B65D 51/24
AU 2020233782 A1 9/2020
(Continued)

OTHER PUBLICATIONS

Translate DE-102020104041 (Year: 2021).*

(Continued)

*Primary Examiner* — Peter J Macchiarolo
*Assistant Examiner* — Monica S Young
(74) *Attorney, Agent, or Firm* — Meagher, Emanuel, Laks, Goldberg & Liao, LLP

(57) ABSTRACT

A system and method are disclosed, that allow for the determination of a mass of a fluid within a container by first vibrating an external surface of a container, where the container contains a fluid (such as a compressed fluid, a gas, a liquid, a mixture of a gas and liquid, or a supercritical fluid). Then, vibration data is received at the external surface of the container, and the vibration data is then converted into one or more frequencies. The mass of the fluid in the container is then estimated based on the one or more frequencies.

27 Claims, 16 Drawing Sheets

Related U.S. Application Data

(60) Provisional application No. 63/531,145, filed on Aug. 7, 2023, provisional application No. 63/471,141, filed on Jun. 5, 2023.

(51) Int. Cl.

| | |
|---|---|
| *G01G 21/28* | (2006.01) |
| *G01G 23/48* | (2006.01) |
| *G01N 9/00* | (2006.01) |
| *G01N 29/036* | (2006.01) |

(58) Field of Classification Search

USPC ............................................................ 73/865

See application file for complete search history.

(56) References Cited

U.S. PATENT DOCUMENTS

| | | | | |
|---|---|---|---|---|
| 5,456,114 | A | * | 10/1995 | Liu .......................... G01F 1/662 |
| | | | | 73/61.79 |
| 5,528,933 | A | * | 6/1996 | Nemirow ................ G01F 17/00 |
| | | | | 73/579 |
| 6,247,361 | B1 | * | 6/2001 | Bender .............. G01F 23/2966 |
| | | | | 73/290 V |
| 8,596,143 | B2 | | 12/2013 | Rieder et al. |
| 9,404,790 | B2 | * | 8/2016 | Deng ..................... G01G 17/04 |
| 2003/0015036 | A1 | * | 1/2003 | Young ................ G01F 23/2966 |
| | | | | 73/579 |
| 2003/0203685 | A1 | * | 10/2003 | Sexton .................. F16F 7/1005 |
| | | | | 440/52 |
| 2005/0092081 | A1 | * | 5/2005 | Spanke .............. G01F 23/2962 |
| | | | | 73/290 V |
| 2005/0149277 | A1 | * | 7/2005 | Bailey .................. G01N 29/024 |
| | | | | 702/56 |
| 2008/0115581 | A1 | * | 5/2008 | Young .................... G01F 22/00 |
| | | | | 73/579 |

| | | | | |
|---|---|---|---|---|
| 2012/0055239 | A1 | * | 3/2012 | Sinha ...................... G01F 25/10 |
| | | | | 73/61.79 |
| 2012/0055253 | A1 | * | 3/2012 | Sinha ................... G01N 29/222 |
| | | | | 73/622 |
| 2014/0260622 | A1 | * | 9/2014 | Ladner ................. G01F 15/007 |
| | | | | 73/579 |
| 2015/0128682 | A1 | | 5/2015 | Downie et al. |
| 2015/0198441 | A1 | * | 7/2015 | De Keizer ........... G01F 23/296 |
| | | | | 702/43 |
| 2016/0356686 | A1 | | 12/2016 | Van Dijk et al. |
| 2017/0313269 | A1 | | 11/2017 | Breed |
| 2018/0120269 | A1 | | 5/2018 | Sinha et al. |
| 2019/0170559 | A1 | * | 6/2019 | Wahlin ................... G01F 23/296 |
| 2019/0271578 | A1 | * | 9/2019 | Moeller ............... G01F 23/296 |
| 2019/0272495 | A1 | * | 9/2019 | Moeller .............. G06Q 10/083 |
| 2021/0180584 | A1 | | 6/2021 | Kamen et al. |
| 2021/0199485 | A1 | | 7/2021 | Young et al. |
| 2022/0212046 | A1 | * | 7/2022 | Pena ....................... A62C 37/50 |
| 2022/0299354 | A1 | * | 9/2022 | Cunnah ................ G01F 23/804 |
| 2022/0299397 | A1 | * | 9/2022 | Agan .................. G01F 23/2966 |
| 2023/0366720 | A1 | * | 11/2023 | Meyerhoff .......... G01F 23/2962 |

FOREIGN PATENT DOCUMENTS

| | | | | | |
|---|---|---|---|---|---|
| CN | 215641021 | U | * | 1/2022 | |
| CN | 114258476 | A | * | 3/2022 | .............. B67D 1/00 |
| DE | 102020104041 | A1 | * | 8/2021 | |
| DE | 102020208538 | A1 | * | 1/2022 | |
| WO | WO-8201584 | A | * | 5/1982 | ........... F17C 13/021 |
| WO | WO-2009118542 | A1 | * | 10/2009 | ............ G01N 29/12 |
| WO | WO-2021001649 | A2 | * | 1/2021 | .............. B67D 1/00 |

OTHER PUBLICATIONS

International Search Report and Written Opinion for corresponding PCT Application No. PCT/US2023/036596, dated Feb. 2, 2024.
International Search Report and Written Opinion for corresponding PCT Application No. PCT/US2024/032407, dated Sep. 19, 2024.

* cited by examiner

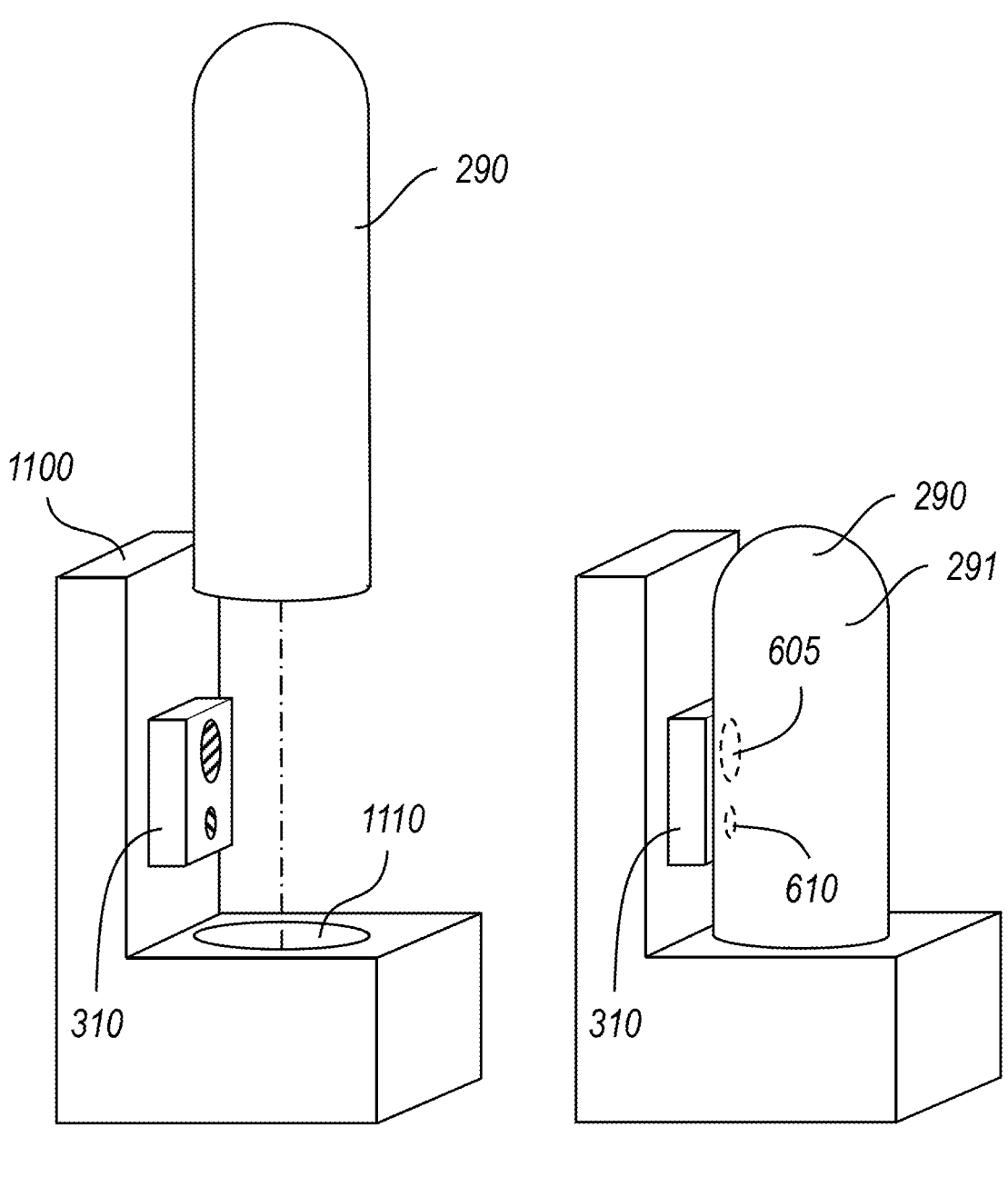
FIG. 11A             FIG. 11B

DEVICE, SYSTEM, AND METHOD FOR FLUID MASS DETERMINATION

CROSS-REFERENCE TO RELATED APPLICATIONS

The present application is a continuation of U.S. patent application Ser. No. 18/386,057, filed Nov. 1, 2023. The present application also claims priority to U.S. Provisional Patent Application Nos. 63/471,141 Filed Jun. 5, 2023, and 63/531,145 Filed Aug. 7, 2023, the contents of each of which are incorporated by reference herein in its entirety.

TECHNICAL FIELD

The present disclosure is drawn to techniques for determining fluid mass within a container, and specifically vibration techniques, preferably non-contact techniques based on resonance of the fluid/container system.

BACKGROUND

In various manufacturing or supply chain industries, as well as in food and beverage, and in medical industries, various useful fluids are stored in tanks or containers, and these industries need to monitor how much material is in a container, using various sensors.

Present day systems are adapted to determining a level of liquid or solid material in a container, by making pressure or volume measurements of the tank or container. However, most methods for measuring pressure or liquid levels require access to the fluid itself (i.e., intrusive measurements). Furthermore, in the case of compressed fluids, these systems routinely fail. For example, a compressed gas will always fill the entire volume of the tank or container, regardless of whether it is a full tank, or a half-full tank. Further, the pressure of a saturated mixture is only a function of the temperature, and not the actual fill level.

As such, a way to non-intrusively measure the mass of a fluid, such as a gas, saturated mixture, liquid, or supercritical fluid, in a container is needed.

BRIEF SUMMARY

Various deficiencies in the prior art are addressed below by the disclosed compositions of matter and techniques.

A first aspect of the present disclosure is drawn to a method for determining a mass of a fluid within a container, using sensors internal or external to the container. The method generally includes (i) vibrating a surface (such as an external surface) of a container containing a fluid with a range of predetermined frequencies; (ii) receiving vibration data at or near the external surface of the container; (iii) converting the vibration data into one or more frequencies and/or converting the vibration data into a variance associated with a range of vibration frequencies; (iv) optionally determining at least one resonance frequency; and (v) estimating/determining a mass of the fluid based on the vibration data (e.g., based on a resonance frequency) and optionally a temperature and/or a pressure.

The vibration data may represent accelerations of the external surface of the container. The vibration data may represent an acoustic signal near an external surface of the container.

The fluid may consist of, e.g., a compressed fluid, a gaseous material, a liquid, a liquid portion and a gaseous portion, or a supercritical fluid. The temperature may be an ambient temperature and/or a temperature of an external surface of the container. The pressure may be a pressure of the fluid in the container.

Vibrating the surface may include an actuator that is configured to sending out a range of vibrational frequencies ('ramp of frequencies'), such as a ramp of frequencies over a range of predetermined frequencies. The ramp of frequencies may use a sine wave. The ramp of frequencies may use a pulse wave, such as a square wave. The ramp of frequencies may use a saw-tooth wave. The ramp of frequencies may consist of frequencies between about 100 Hz and about 10 KHz. The ramp of frequencies may have a range of frequencies of 3500 Hz or less (i.e., the difference between the lowest frequency and highest frequency is 3500 Hz or less). The ramp of frequencies may be a continuous ramp. The ramp of frequencies may be a discontinuous ramp. The time for one ramp of frequencies may be less than 2 s. In some embodiments the time for one ramp of frequencies may be less than 200 ms. In some embodiments, a single vibration cycle (i.e., generating a vibration through detecting the responsive vibration data) is used to determine a mass. In some embodiments, a plurality of vibration cycles are performed, and the data is collectively used to determine the mass of the fluid. In some embodiments, the mass may be estimated based on the most common dominant frequency detected from multiple cycles of vibrations. In some embodiments, the mass may be estimated based on the median of the frequencies detected from multiple cycles of vibrations.

In some embodiments, the mass may be estimated based on the vibration data and a temperature (such as an ambient temperature, such as a temperature of an external surface of the container). In some embodiments, the mass may be estimated after a temperature has not changed by more than a predetermined amount (e.g., no more than 2° C.) over a predetermined period of time (e.g., at least 5 seconds).

In some embodiments, the mass may be estimated based on one or more frequencies, a temperature, a pressure, and information related to a design of the container and the fluid inside it. The method may include receiving information containing the pressure from a sensor configured to measure a pressure inside the container.

In some embodiments, the method may include receiving information defining the temperature. In some embodiments, the method may include estimating a temperature of the fluid based on the received information or ambient measured temperature, and/or displaying the estimated mass or a value based on the estimated mass.

In some embodiments, the mass may be estimated based on the one or more frequencies, the temperature, and the pressure. In some embodiments, the mass may be estimated based on the one or more frequencies, the temperature, and information related to the design of the container. The information related to the design of the container may include a Department of Transportation (DOT) cylinder rating, what material the container is comprised of, a wall thickness, an ISO pressure rating, or a combination thereof. In some embodiments, the information related to the design of the container may be inferred from the one or more frequencies of a cylinder filled with a known mass of the fluid. In some embodiments, the estimated mass may be determined based on one or more frequencies and a frequency related to a container filled to full capacity.

In some embodiments, the mass may be estimated based on the one or more frequencies and information about the fluid/container system. In some embodiments information about the fluid/container consists of a frequency for an empty container and a frequency for a full container. In some embodiments information about the fluid/container is stored in an RFID tag on the container. In some embodiments, the method may include comparing the mass to a previously estimated mass. In some embodiments, the method may include storing, in a database, a date and/or time and the mass. In some embodiments, the method may include automatically requesting or ordering a new container, or automatically requesting maintenance assistance, when the mass is below a predetermined threshold.

A second aspect of the present disclosure is a sensor system that can be used with the disclosed method. The sensor system may include an activation and detection subsystem configured to be positioned on or near an external surface of a container containing a fluid. The activation and detection subsystem may be configured to: (i) cause a vibration at a range of desired frequencies at the external surface of the container; and (ii) receive vibration data at or near the external surface of the container. The sensor system may also include a temperature sensor and/or a pressure sensor. The sensor system may include one or more processor(s). The processor(s) operably communicates with the activation and detection subsystem and the optional temperature and pressure sensors. Further, the processor(s) may be configured to, collectively: (i) receive the vibration data from the activation and detection subsystem and optionally a temperature from the temperature sensor and optionally a pressure from the pressure sensor; (ii) convert the vibration data into one or more frequencies; and (iii) estimate a mass of the fluid based on the one or more frequencies and optionally the temperature and/or a pressure.

In some embodiments, the activation and detection subsystem may comprise a single piezoelectric or piezoresistive transducer, and the processor is configured to: (i) cause the piezoelectric or piezoresistive transducer to vibrate at a desired frequency; and (ii) receive vibration data from the piezoelectric or piezoresistive transducer. In some embodiments, the activation and detection subsystem may comprise a speaker and a microphone, and the processor is configured to: (i) cause the speaker to vibrate at a desired frequency or range of frequencies; and (ii) receive vibration data from the microphone. In some embodiments, the actuation is performed using a combination of several frequencies. In some embodiments the actuation is done using a speaker outputting noise. In some embodiments the actuation is done using a voice-coil actuator driven by a square-wave signal where the frequency of the pulse wave is modulated such that it starts a one frequency and sweeps through a range of frequencies in a set amount of time. In some embodiments, the activation and detection subsystem may comprise a voice-coil actuator in contact the external surface in order a vibrate the external surface; and a microphone-based detection subsystem configured to receive vibration data without being in contact with the external surface.

In some embodiments, the detection is done using a vibration sensor in contact with the external surface. In some embodiments, the vibration sensor is an accelerometer.

The activation and detection subsystem may preferably not come into contact with the fluid.

The container may be, e.g., filled with a gas, partially filled with a gas and the remainder filled with a liquid, entirely filled with a liquid, or filled with a supercritical fluid.

In some embodiments, the sensor system may include a housing configured to cover at least a part of the activation and detection subsystem. In some embodiments, the activation and detection subsystem may be removably coupled to the container. In some embodiments, the activation and detection subsystem may be permanently attached to the container. In some embodiments, the activation and detection subsystem may communicate wirelessly with the processor. In some embodiments, the activation and detection subsystem may communicate electrically with the processor.

In some embodiments, the processer may be configured to generate an alert if no container is present. In some embodiments, the processor may be configured to generate an alert if the incorrect container is present.

In some embodiments, the processor may be configured to generate an alert or request a replacement container when the estimated mass is at or below a first predetermined threshold. In some embodiments, the processor may be configured to determine a rate at which the estimated mass within the container is changing. In some embodiments, the processor may be configured to estimate a date and/or time at which the mass within the container will be below a second predetermined threshold. In some embodiments, the processor may be configured to generate an alert or request a replacement container when the estimated date and/or time differs from a current date and/or time by less than a third predetermined threshold.

BRIEF DESCRIPTION OF DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

FIGS. 11A and 11B are illustrations of a system using a slot to position a container within a system.

Figure 1:
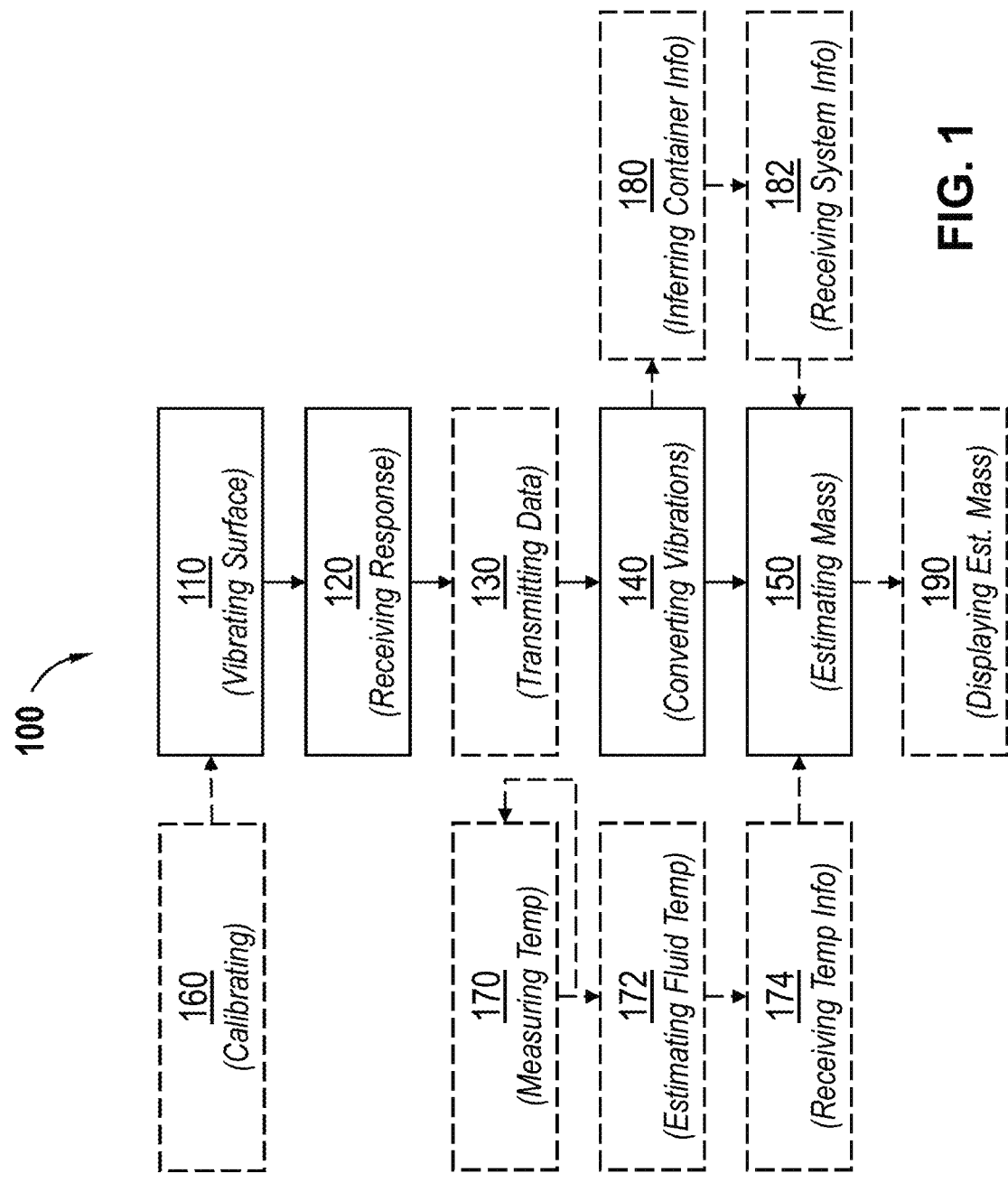
FIG. 1 is a flowchart for an embodiment of a method for determining mass of a fluid within a container.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for illustrative purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

As used herein, the term "about" may be used in conjunction with numerical values and/or ranges. The term "about" is intended to refer to those values equal to or near a recited value. For example, "about 100 [units]" may mean within ±10% of 100. The term "amount" may include values within ±10%, ±9%, ±8%, ±7%, ±6%, ±5%, ±4%, ±3%, ±2%, ±1%, less than ±1%, equal to, or any other value or range of values therein, including asymmetrical ranges (e.g., ±4%/−6%). Furthermore, the phrases "less than about [a value]" or "greater than about [a value]" should be understood in view of the definition of the term "about" provided herein.

Referring to FIG. 1, a flowchart for method for determining a mass of a fluid within a container can be seen. The container may be any appropriate container for holding a desired fluid. In some embodiments, the container may contain less than 500 g of the fluid. In some embodiments, the container may have a volume of less than 5 L. In some embodiments, the container may have a volume of 5 L-500 L. In some embodiments, the container may have a volume of at least 500 L. In some embodiments, the container may be composed of a metal (such as aluminum, stainless steel, etc.) In some embodiments, the container may be composed of a polymer (such as polypropylene (PP), polyethylene terephthalate (PET), etc.). In some embodiments, the container may be composed of a glass (e.g., soda-lime glass, borosilicate glass, etc.). In some embodiments, the container may be composed of a combination of materials.

The method 100 may include vibrating 110 a surface (such as an external surface or an internal surface) of a container that contains a fluid. In some embodiments, the fluid may be a fluid at an elevated pressure. In various embodiments, the fluid may be a gas, saturated mixture, a liquid, or a supercritical fluid. In some embodiments, the fluid may consist of a gaseous material. In some embodiments, the fluid may consist of a liquid. In some embodiments, the fluid may consist of a gas/liquid mixture. That is, in some embodiments, the fluid may consist of a gaseous phase (or gaseous portion) and a liquid phase (or liquid portion). In some embodiments, the fluid may consist of a supercritical fluid. As is understood in the art, a supercritical fluid is any substance at a temperature and pressure above its critical point, where distinct liquid and gas phases do not exist, but below the pressure required to compress it into a solid. The fluid may be free of solid materials.

Various means or techniques for generating the vibration may be utilized.

Figure 2A:
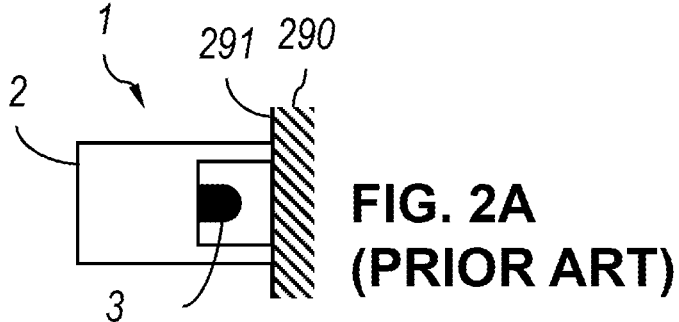
FIGS. 2A-2B are simplified cross-sections of vibration devices.

Conventional approaches often include techniques that are required to be mounted internally to the container, such as floats, fiberoptic or waveguide sensors. An exception to this are technologies to "knock" on an external surface. That is, vibrations may be generated by, e.g., an impact actuator configured to strike the exterior surface of the container. Referring briefly to FIG. 2A, the vibration device 1 is an impact actuator that includes a body 2 and an impactor 3 coupled to the container 290. The impact actuator may be configured to, e.g., pneumatically or hydraulically cause the impactor 211 to strike an external surface 291 of the container 290, causing acoustic waves in the fluid inside the container in response to the container being struck. This "knocking" generates an incredibly large number of resonance frequencies (including their harmonics) within the fluid/container system that can lead to highly erroneous measurements due to challenges in determining dominant frequencies. For example, if a container's dominant resonance frequency is at 1000 Hz, but knocking also causes resonance frequencies to appear at 500 Hz, the 500 Hz frequency will interfere with the 1000 Hz frequency, making an accurate reading at 1000 Hz impossible. Furthermore, these different frequencies can change magnitude with fill level, making it very challenging to track them in order to determine the true fill level.

Rather than "knocking" on the container (e.g., where a striking or contact element is out of contact with the surface of the container, and may only contact the surface for a brief period of time to cause a vibration), the present disclosure utilizes a vibration technique wherein the contacting element (e.g., the component that transmits vibrations to the surface) remains in contact with the external surface of the container, and only specific frequencies are generated. This enables the user to activate only certain frequencies avoiding the issues mentioned above. Furthermore, since the energy is focused on a specified range of frequencies, less energy is required to generate a detectable signal.

In various embodiments, the container is a metal container, such as aluminum, steel, or stainless-steel container.

The power used to generate the vibration may vary. In some embodiments, the power (e.g., wattage) needed may be $\frac{1}{10}$ watt or less. In some embodiments, the power needed may be $\frac{1}{4}$ watt or less. In some embodiments, the power needed may be $\frac{1}{2}$ watt or less. In some embodiments, the power needed may be 1 watt or less. In some embodiments, the power needed may be 2 watts or less. In some embodiments, the power needed may be 5 watts or less. In some embodiments, the power needed may be 10 watts or less. In some embodiments, the power used will be determined based on the environment. In some embodiments, a microphone may be used to determine the "noise" level in the environment, without vibrations generated by the system. If the noise level is above a threshold, it may increase the power used to generate vibrations. If the noise level is below a threshold, it may decrease the power used to generate vibrations. In some embodiments, the power used may vary based on a determined signal-to-noise ratio (SNR). That is, if the SNR is above a threshold, the device may lower the power without impacting accuracy. Conversely, if the determined SNR is below a threshold, the device may adjust the power upwards to increase the SNR. In some embodiments, the vibration is generated by a speaker, e.g., a voice coil actuator. In some embodiments the speaker is in contact the exterior surface of the container. In some embodiments, the vibration is generated by, e.g., a piezoelectric vibrator in contact with the exterior surface of the container.

Figure 2B:
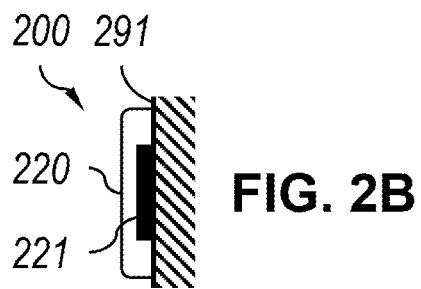

Referring briefly to FIG. 2B, the disclosed vibration devices (e.g., sensor system 200) may include a substrate 220 with a piezoelectric or voice-coil vibrator 221. The substrate may be attached to or otherwise held in contact with (e.g., adhered, welded, clamped, pushed etc.) the external surface 291 of the container 290 such that the piezoelectric or voice-coil vibrator can be in direct contact with the container. In some embodiments the piezoelectric or voice-coil vibrator is in contact with a structure which is in contact with the container 290. Sec, e.g., FIG. 9A. The connection must be sufficient to allow the exterior surface of the container to vibrate in response to having the speaker or piezeoelectric vibrator actuate.

The vibrations may be sent out as a frequency modulated ramp of frequencies. The ramp of frequencies may use sine waves. The ramp of frequencies may be pulse waves. The pulse waves may be square waves (i.e., a pulse wave with a 50% duty cycle). The ramp of frequencies may be saw-tooth waves. The pulse waves may have a duty cycle of 10-90%. The pulse waves may have a duty cycle of about 50%. The frequencies may ramp from an initial frequency to a final frequency. In some embodiments, each frequency is a frequency in the range of human hearing (e.g., about 20 Hz—about 20,000 Hz). In some embodiments, the initial frequency may be no less than 1 kHz, and the final frequency may be at no more than 10 kHz. In some embodiments, the range of frequencies may be less than 5 kHz. In some embodiments, the ramp may be a continuous ramp of frequencies. In some embodiments, the ramp may be discontinuous. That is, in some embodiments, there may be specific "windows" of frequencies that are used. These windows may be chosen such that they isolate a specific resonating mode. The ability to target a specific mode is an important aspect of the disclosed invention. Compared to actuating all frequencies, as would be the case when knocking on the container, for example, this reduces the power required, it reduces the sound generated, it increases signal-to-noise, and it reduces the amount of data needed to be processed. It also enables improved resolution of the measured frequency as the sample frequency can be tailored for a specific use case.

In some embodiments, the range of frequencies (the difference between the highest and lowest frequency) may be no more than 5000 Hz. In some embodiments, the range of frequencies (the difference between the highest and lowest frequency) may be no more than 4000 Hz. In some embodiments, the range of frequencies (the difference between the highest and lowest frequency) may be no more than 3500 Hz. In some embodiments, the range of frequencies (the difference between the highest and lowest frequency) may be no more than 3000 Hz. In some embodiments, the range of frequencies (the difference between the highest and lowest frequency) may be no more than 2000 Hz. In some embodiments, the range of frequencies (the difference between the highest and lowest frequency) may be no more than 1500 Hz. In some embodiments, the range of frequencies (the difference between the highest and lowest frequency) may be no more than 1000 Hz. In some embodiments, the range of frequencies (the difference between the highest and lowest frequency) may be no more than 500 Hz. In some embodiments, the range of frequencies (the difference between the highest and lowest frequency) may be at least 100 Hz. In some embodiments, the range of frequencies (the difference between the highest and lowest frequency) may be at least 500 Hz. In some embodiments, the range of frequencies (the difference between the highest and lowest frequency) may be at least 1000 Hz.

The narrower the range of frequencies, the less energy required and/or more focused the energy you apply is. Further, having a narrower range of frequencies also speeds up the analysis. Often, the range in which target resonance frequencies will be found are known ahead of time; in such cases, it can be useful to sweep that range of frequencies, plus a predetermined amount more on either end of that range (e.g., if the known range is 1000-2000, the useful sweep range may be ±150 Hz, or 850-2150 Hz). In some embodiments, that predetermined amount may be no more than 1000 Hz. In some embodiments, that predetermined amount may be no more than 500 Hz. In some embodiments, that predetermined amount may be no more than 200 Hz.

While the resonance frequencies used for determining mass preferably utilize the dominant mode of resonance, there are many modes of resonance, in addition to the dominant mode. In some embodiments, a single mode of resonance is utilized. In some embodiments, more than one mode of resonance is utilized. In some embodiments, other modes may be used to detect or confirm attributes about the container, such as material of construction, etc.

Additionally, the range of frequencies typically varies with size of the container. For example, a large container (e.g., a large steel vessel in a manufacturing plant) will have lower resonance frequencies than a smaller container (e.g., a small glass bottle). Because the resonance is influenced by a range of variables including materials of construction, thickness, shape, the fluid inside the container, etc., size alone is not determinative, but size can be useful for estimating a useful range to consider if no other data for a particular container is available.

In some embodiments, the vibrations are generated for a predetermined period of time. In some embodiments, the predetermined period of time may be no more than 2 s. In some embodiments, the predetermined period of time may be no more than 500 ms. In some embodiments, the predetermined period of time may be no more than 250 ms. In some embodiments, the predetermined period of time may be no more than 200 ms. In some embodiments, the predetermined period of time may be no more than 150 ms. In some embodiments, the predetermined period of time may be no more than 100 ms. In some embodiments, the predetermined period of time may be no less than 25 ms. In some embodiments, the predetermined period of time may be no less than 50 ms.

In some embodiments, the vibrations are brief (e.g., no more than 500 ms) "chirps" of sound, covering a range of sound of 2000 Hz or less. As disclosed herein, such chirps are highly efficient, saving and focusing energy, and making it easier to determine the target resonance frequency.

Referring to FIG. 1, the method 100 continues by receiving 120 responsive vibrations at the external surface (or internal surface) of the container.

Figure 3:
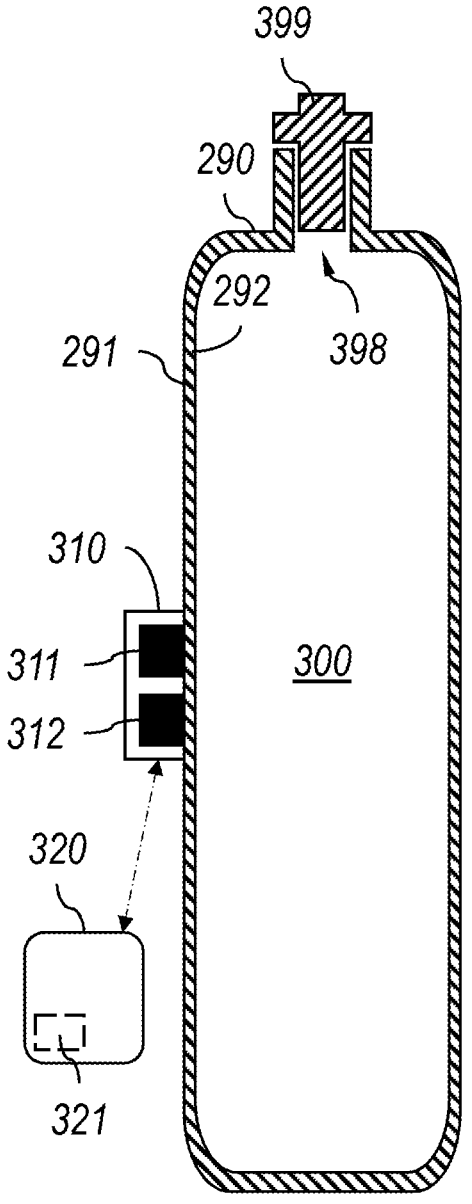
FIG. 3 is a schematic illustration of an embodiment of a system for determining mass of a fluid within a container.

Specifically, what is occurring can be described with respect to FIG. 3. In FIG. 3, an activation and detection subsystem 310 may be attached to a container 290. In some embodiments, the subsystem may be removably attached (e.g., magnetically attached, threaded into place, held in place by a clamp or by an elastic band, etc.). In some embodiments, the subsystem may be attached via, e.g., an adhesive. In some embodiments, the subsystem may be attached via a secondary structure.

The container 290 preferably has a single port (here, port 398) (e.g., a port through which the tank can be filled and emptied as needed). In some embodiments, the container may be a liquified gas cylinder). In some embodiments, the container may be a compressed $CO_2$ canister. In some embodiments, the container may be a compressed nitrogen or nitrous oxide canister. In some embodiments, the container may be a compressed oxygen canister. In some embodiments, the container may be filled with beverage flavorings. In some embodiments, the container may be filled with chemicals to be used in a liquid compounding. In some embodiments, the container may include at least one medical gas (such as $CO_2$, oxygen, nitrous oxide, etc.). The term "medical gas" is intended to be interpreted broadly, and non-limiting examples include, e.g., air, oxygen, or a mixture thereof, either for resuscitation, continuous positive airway pressure (CPAP) therapy, or any other purpose. It also encompasses other gases, for example for the delivery of different gas mixtures, therapeutic agents, anesthetics, pharmaceuticals, or other agents, either alone or mixed with air. The gases may be either at ambient or another temperature. The gases may be delivered at a relatively low pressure, for example as supplementary oxygen, or at a higher pressure, for example for resuscitation. The present invention is not limited in scope to any particular gas or treatment.

The container may have, e.g., one or more valves 399 coupled to the port 398, to control flow of the fluid in and out of the cylinder.

The activation and detection subsystem 310 includes a vibration device 311 (such as those described with respect to FIGS. 2A and 2B) that can vibrate an external surface 291 of the container 290. The vibration device in such cases may be disposed at or near the external surface. The vibrations travel through the container 290, through an internal wall 293 (which defines internal surface 292) of the container 290, and into the fluid 300. Note, in the figures, a single container wall is shown for simplicity, but as will be understood, the container wall may be composed of multiple layers. The fluid 300 then vibrates in response to the vibration generated by the vibration device 311. That is, the fluid generates vibrations that are responsive to the vibrations generated on the external surface. These responsive vibrations may then pass back through the internal surface 292 of the container and through to an external surface 291. A sensor 312 (such as a microphone, a piezoelectric or piezoresistive transducer, etc.) can then detect the responsive vibrations transmitted by the fluid to the detecting sensor. The detecting sensor may be configured to detect any kind of vibrational data. As used herein vibrational data may include any transmitted, measurable response to the generated by the vibration device. Such transmitted, measurable responses may include, e.g., deformation/strain, or an acoustic signal.

This may include generating data representative of the received vibrations (e.g., amplitude data, frequency data, etc.). The responsive vibrations may be amplified for frequencies around the resonance frequency of the system. This resonance frequency may primarily be a function of the mass of the fluid. This resonance frequency may primarily be a function of the pressure of the fluid. This resonance frequency may be a function of both the pressure and the mass of the fluid.

It should be understood that in some embodiments, the vibration device can be disposed within the container, at or near an internal surface. That is, the vibration device may be operably coupled to an internal surface, rather than an external surface. Similarly, in some embodiments, the sensor that detects the responsive vibrations may be disposed within the container, at or near an internal surface. As used herein, the term "near" is intended to refer to a minimum distance away from the surface such that the surface can still be vibrated with enough power to be detectable by a sensor. This will vary based on design, input power, etc., but in some embodiments, this may be, e.g., less than 6 inches, less than 5 inches, less than 4 inches, less than 3 inches, less than 2 inches, less than 1 inch, less than 0.5 inches, less than 0.25 inches, or less than 0.01 inches.

In some embodiments, the vibration device is operably connected to an intermediate structure that is in contact with the external surface of the container.

In some embodiments, the activation and detection subsystem may be integrated into a label on the container. For example, a thin-film piezo vibrator and a thin-film piezo detector can be coupled to a label (such as on an internal surface of a label) disposed around a container. Alternatively, a microelectromechanical system (MEMS) accelerometer can be integrated into the label to detect the vibrations. If the label also includes an RFID or NFC antenna, the labels can receive power and/or send updated information (such as updated vibration data) when the label is scanned.

Referring to FIG. 1, in some embodiments, the method 100 may include transmitting 130 data representative of the received vibrations to one or more processor(s), such as in a controller, server, computer, etc. As seen in FIG. 3, a remote controller 320 can be seen, that comprises one or more processors 321, communicating with the activation and detection subsystem 310. This transmitting step may be done via any appropriate method. In some embodiments, the data is transmitted wirelessly (e.g., using an appropriate wireless protocols or standards, such as Bluetooth, near field communication (NFC) (including RFID), Wifi, Zigbee, etc.). In some embodiments, the data is transmitted electrically over wires.

In some embodiments, the activation and detection subsystem may be configured to communicate with one or more other activation and detection subsystems. In some embodiments, a first subsystem may transmit data to a second subsystem. In some embodiments, a first subsystem may coordinate timing of its vibration and detection with a second subsystem. For example, if two subsystems are coupled to the same container (or to an adjacent containers), it may be beneficial to not attempt to vibrate and detect at the same time (or overlapping times).

Figure 4A:
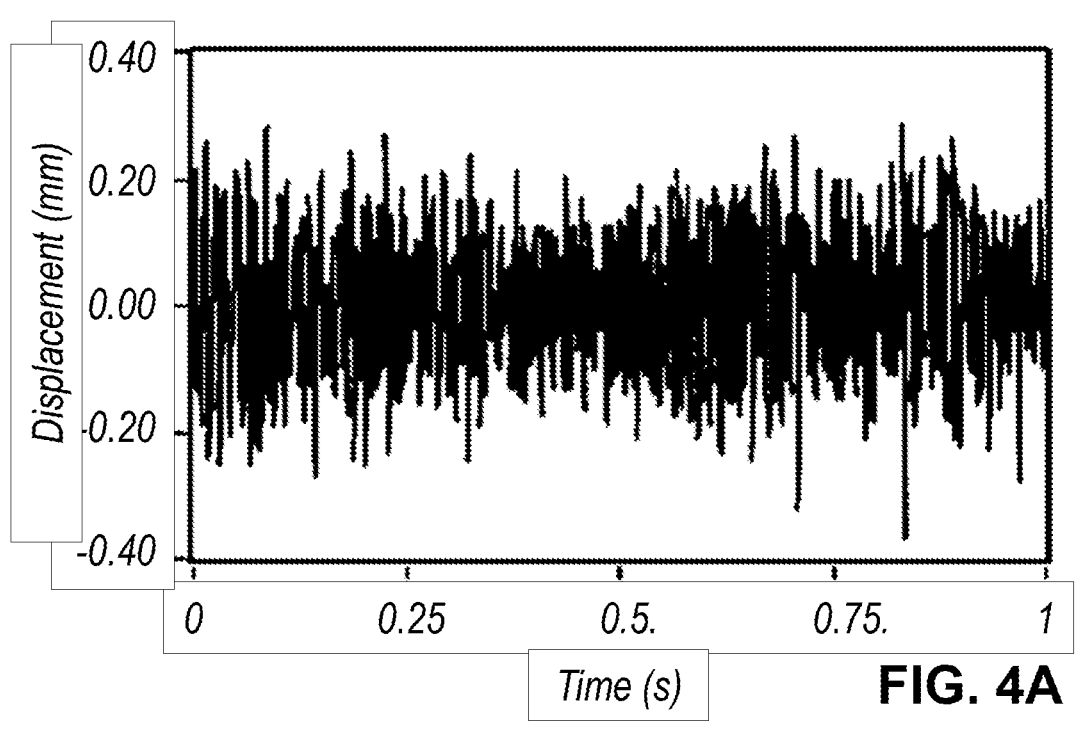
FIG. 4A is a graph providing an example of vibration data received from a sensor.
Figure 4B:
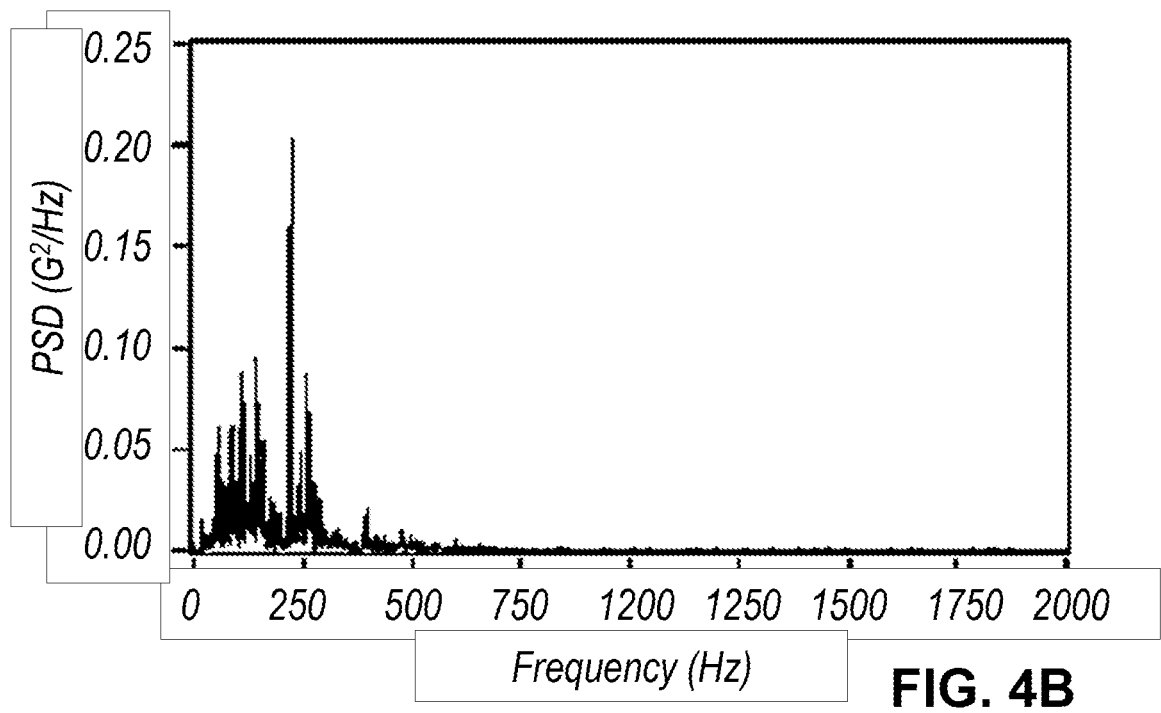
FIG. 4B is a graph providing an example of vibration data converted to one or more frequencies.

Referring to FIG. 1, the method 100 includes converting 140 the detected responsive vibrations into one or more frequencies. As seen in FIG. 4A, the data representative of the responsive vibrations may include displacement data over a period of time. In some embodiments, the data may include acceleration data over a period of time. As seen in FIG. 4B, that vibration data can be converted into one or more frequencies. In FIG. 4B, a Fast Fourier Transform (FFT) was used to convert the vibration data from FIG. 4A into one or more frequencies. For example, the frequency may be determined based on the power spectrum, which is calculated using an FFT. Peaks are then identified in the results of the FFT. Here, a resonance frequency of about 200 Hz is seen. An alternative method to determine the resonance frequency is to monitor the variance of the vibration data as a function of the actuation frequency. The variance will be associated with a certain range of vibration frequencies. The actuation frequency that yields the largest variance can be determined to be the dominant resonance frequency.

In some embodiments, the method may include determining whether a container is present. If no vibration data is received, or if the largest magnitude identified through an FFT is below a threshold, a container may be considered not present, and/or the container may be considered incorrectly positioned. If a container is present and/or positioned correctly, the method may include allowing fluid to be removed from the container. If no container is present, the method may include generating an alert, preventing a system from attempting to remove fluid from the container, or a combination thereof.

Figure 4C:
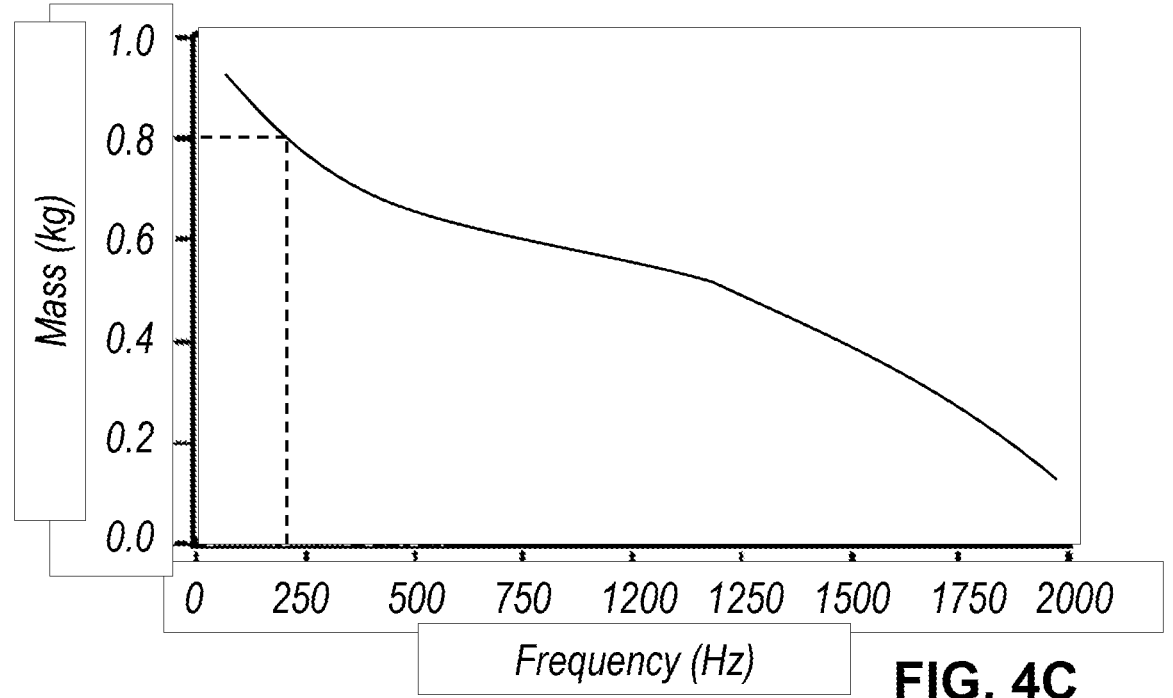
FIG. 4C is a graph providing an example of a correlation of the one or more frequencies to mass of a fluid.

The method 100 includes estimating 150 a mass of the fluid based on the one or more frequencies and a temperature. This is typically accomplished by comparing one or more resonance frequencies with empirically acquired data. Alternatively, it can be measuring the frequency of at least one known mass and using a predetermined formula converting frequency to mass. As seen in FIG. 4C, the solid line shows empirically captured data for a given container with a given fluid at a given temperature. Using the example from FIG. 4B, a resonance frequency of around 200 Hz corresponds (see dashed lines) to a mass in that container of around 800 grams (0.8 kg).

It will be readily understood that such correlation data may be container, fluid, and temperature specific.

To improve accuracy, a temperature may be measured. This temperature should be representative of the temperature of the fluid.

In some embodiments, the method 100 may include measuring 170 a temperature and/or a pressure.

In some embodiments, the temperature of the fluid is measured directly. For example, in a system where the fluid is being utilized, a temperature sensor can measure and transmit the actual temperature of the fluid in the container after it exits the container.

In some embodiments, the temperature is measured once. In some embodiments, the temperature is measured repeatedly. In some embodiments, the method may involve making multiple measurements, but reporting on a single value—for example, monitoring several hours of temperatures, and providing a mean temperature.

In some embodiments, the temperature of the fluid is not or cannot be measured directly. In such embodiments, other temperatures (such as ambient temperatures or the temperature of an external surface of the container) may be measured.

In some embodiments, the temperature is an ambient temperature. In some embodiments the ambient temperature is approximately the same as the fluid temperature. For example, in some embodiments, the container may be in a temperature controlled room for sufficiently long that the temperature of the fluid may be approximated by the ambient temperature. In some embodiments, the temperature may be measured by, e.g., a remote thermometer.

In some embodiments, the temperature is a temperature of an external surface of the container. For example, if the temperature of a thin-walled container is a particular temperature, in some embodiments the temperature of the fluid may be approximated by the temperature of an external surface.

In some embodiments, the temperature is a temperature difference between two measurement locations approximating the difference between the ambient temperature and the fluid temperature.

Thus, even if the measured temperature is not the temperature of the fluid, it may be able to provide sufficiently accurate results.

In some embodiments, the method 100 may include estimating 172 a temperature of the fluid based on the measured temperatures. For example, it is possible to estimate a temperature of the fluid given the fluid composition, the container geometry and materials of construction, and the ambient temperature over a recent period of time.

In some embodiments, the method may involve estimating the temperature of the fluid based on the temperature profile over a recent period of time (e.g., the previous 30 minutes, the previous hour, the previous day, etc.). For example, if the ambient temperature has consistently been 20° C. for several days, but in the last 10 minutes has risen to 25° C., the method may involve making an estimation as to how far above 20° C. the temperature of the fluid has risen. Some logic may be used to simplify some estimations. For example, if the ambient temperature was previously 25° C., but was reduced to 20° C., the method may involve first determining if a threshold amount of time has passed since the temperature change occurred. If so, the method may assume the temperature has equilibrated at the new temperature of 20° C. If not, the method may involve, e.g., interpolation of the data, modeling of the system, or some other appropriate methodology for estimating a temperature of the fluid.

In some embodiments the system is instructed to not update the mass measurement if the temperature has not been stable for long enough. In some embodiments this time is more than 1 s. In some embodiments this time is more than 10 s. In some embodiments this time is more than 1 minute. In some embodiments this time is more than 10 minutes.

In some embodiments the system is instructed to not update the mass measurement if the temperature is above a certain predetermined temperature. In some embodiments this predetermined temperature is close to the critical temperature of the fluid.

In some embodiments, the method 100 may include receiving 174 information that defines the temperature. In some embodiments, the measured temperature (see measuring 170 step) and/or estimated temperature (see estimating 172 step) may be received. For example, a temperature sensor measuring an ambient temperature of a temperature-controller room may be configured to wirelessly transmit the temperature to a remote processor, which is configured to receive the temperature data and any vibration data and perform any necessary calculations.

In some embodiments, a user may define the temperature. For example, in some embodiments, the method is used in a system where the temperature is not digitally or electrically communicated to a processor for performing some of the steps of the method. That is, in some embodiments, a user may walk to the container, take a surface temperature reading of the container with a hand-held instrument, then walk back to a computer and type in the measured temperature. That user-entered information may then be used to define the fluid temperature or estimate the fluid temperature.

In some embodiments, the method may involve estimating the mass based on the one or more frequencies and information related to the fluid/container combination. Thus, in some embodiments, the method 100 may include receiving 182 information related to the system. This information may include, but is not limited to, a frequency when the container is at maximum capacity, a frequency when the contained is at minimum capacity. In some embodiments the information also includes information about the fluid in the container.

In some embodiments, this information is made available via an RFID transmitter or a 2D or 3D barcode on an exterior surface of the container, that is then read by an appropriate device. In some embodiments, the one or more processors in the sensor system may be configured to receive information from an RFID chip containing a frequency for an empty container and a frequency for a full container. In some embodiments, the information received from the RFID chip may contain a code representing a type of container, and the processor(s) may be configured to reference a database to convert the code into frequencies for full and empty containers. In some embodiments, the information received from the RFID chip may contain a code representing what fluid is in the container.

In some embodiments, the method may involve estimating the mass based on the one or more frequencies, the temperature, and information related to the design of the container. Thus, in some embodiments, the method 100 may include receiving 182 information related to the design of the container. This information may include, but is not limited to, a Department of Transportation (DOT) cylinder rating or other similar rating as appropriate, what material the container is comprised of, a wall thickness, an ISO pressure rating, or a combination thereof. In some embodiments, this information is provided by a user.

In some embodiments, this information is made available via an RFID transmitter or a 2D or 3D barcode on an exterior surface of the container, that is then read by an appropriate device.

In some embodiments, this information is inferred 180 from the determined one or more frequencies (see converting 140 step) of a container filled with a known mass of the fluid. For example, in some systems, new containers will always arrive full, and containing a fixed amount of material (e.g., 10 kg of fluid). When that full container is provided, the one or more frequencies may be determined, and using a conversion table (an example is shown below), the type of container can be determined.

TABLE 1

(Example of Resonance Frequency/Container Type Correlation)

| Frequency | Container Information |
|-----------|----------------------|
| 200 Hz | DOT 3A |
| 150 Hz | DOT 3AX |
| 125 Hz | DOT 3AL |

In some embodiments, the mass may be estimated based on resonance information, without temperature and/or pressure information. In some embodiments, the mass may be estimated based on a combination of resonance and temperature information. In some embodiments, the mass may be estimated based on a combination of resonance and pressure information. In some embodiments, the mass may be estimated based on a combination of resonance, temperature, and pressure information. In some embodiments, resonance is used to determine a quality of the fluid (e.g., the liquid vs. gas balance), the mass is determined based on the determined quality and the temperature information.

The resonance information may be acquired in various ways. In some embodiments, one can take the input signal, sweep, e.g., a sine or pulse wave across frequencies, then gather the output. For each sweep, a fast Fourier transform (FFT) can be performed on the output to determine a dominant frequency. As noted herein, the frequency may be determined based on the power spectrum, which is calculated using an FFT. Alternatively, in some embodiments, one can look at the ratio between output and input at a particular frequency. The frequency that yields the largest output signal can be considered the resonance frequency.

In some embodiments, the temperature may be monitored over time, and the mass may be estimated when the temperature has remained generally stable for a period of time. For example, in some embodiments, the mass may be estimated only if the temperature has not varied by more than a predetermined amount (such as $\pm 0.5°$ C., $\pm 1°$ C., $\pm 2°$ C., etc.) for a predetermined period of time (such as 1 second, 2 seconds, 5 seconds, 1 minute, etc.).

In some embodiments, the pressure of the fluid may be monitored. For example, it is known that, for compressed fluids, the pressure of in the container will remain substantially constant (at a given temperature) until all of the liquid has been utilized. Thus, while the pressure is generally not useful for determining mass while a compressed fluid exhibits a liquid phase, the pressure will be quite useful once there is no more liquid in the container. As such, in some embodiments, a pressure sensor may be used to estimate mass in the container.

In some embodiments, multiple "cycles" of vibration readings may be used to estimate mass. For example, if a vibration and detection can be performed in 200 ms, 5 "cycles" of vibration and detection can be performed in 1 second. In some embodiments, if there are n cycles of readings, there may be a total of 1 mass estimate for all n cycles. For example, all vibration data may be summed and a single mass estimate made based on the summed data.

In some embodiments, there may be n+1 mass estimates for all n cycles. For example, an estimate may be made for each cycle (e.g., n estimates), and then all the readings may be statistically combined (including, e.g., being averaged together or the median of the determined frequencies) (e.g., 1 additional estimate).

In some embodiments several sweeps are performed within a set amount of time and the mass is determined based on the most common dominant frequency detected. In some embodiments several sweeps are performed and the mass is determined based on the median of the dominant frequencies detected. In some embodiments the number of sweeps is more than 2. In some embodiments the number of sweeps is more than 5. In some embodiments the number of sweeps is more than 10. In some embodiments the number of sweeps is more than 100. In some embodiments, the sweeps may be performed intermittently. In some embodiments the sweeps may be performed continuously. In some embodiments, the mass estimate may be updated continuously. In some embodiments, the mass estimate may be updated once per second. In some embodiments, the mass estimate may be updated at the same frequency that the sweeps are performed. In some embodiments, the mass estimate may be updated at a lower frequency (e.g., less often) than the sweeps are performed. In some embodiments, statistics used for a mass determination could be based the previous n cycles or sweeps. In some embodiments, n may be at least 2, at least 3, or at least 4. In some embodiments, n may be less than 60, less than 30, less than 20, or less than 10.

In some embodiments, the temperature may be monitored over time, and the mass may be estimated when the temperature has remained generally stable for a period of time. For example, in some embodiments, the mass may be estimated only if the temperature has not varied by more than a predetermined amount (such as ±0.5° C., ±1° C., ±2° C., etc.) for a predetermined period of time (such as 1 second, 2 seconds, 5 seconds, 1 minute, etc.).

In some embodiments, the method 100 further comprises displaying 190 the estimated mass or a value based on the estimated mass. For example, in some embodiments, the method may involve displaying the actual estimated mass (e.g., "5 kg remaining"). In some embodiments, the method may involve displaying the estimated mass as a percentage of a mass of a full container (e.g., "80% remaining"). In some embodiments, the method may involve displaying a graphic illustrative of this (e.g., 4 bars fully lit up, and a fifth unlit bar displayed on a screen). In some embodiments, one or more processor(s) may be coupled to a display, and the processor(s) may generate a graphical user interface (GUI) on the display. The GUI may display various information related to the fluid and/or container, such as the mass of the fluid in the container. If the processor(s) have determined the fluid mass has changed over a period of time, the GUI may include the change over that period of time. The GUI may also show alerts or warnings. For example, if the estimated mass is below a predetermined threshold, the GUI may either display a written notice indicate a low value, and/or the GUI may highlight or change color of a mass to indicate how close to being empty the container is (e.g., showing mass values in green when the mass is over 25% full, values in yellow when the mass is 10-25% full, and values in red when the mass is less than 10% full).

One way to know how much mass is in a system is to first calibrate the system. In some embodiments, the method may include calibrating 160 the system. The calibration may include determining at least one resonance frequency of a full container and determining at least one resonance frequency of an empty container. As will be understood, the method also needs to know what happens in between full and empty. In some embodiments, the general shape of the curves will be known—see FIG. 4C, for example. There will be a different curve if the fluid is a liquid than if it is a gas. If the fluid is a compressed gas that has liquified, the curve will be a combination of the two—a liquid-like curve until the liquid is gone, then it will follow a gas-like curve. In some embodiments, these curves may be determined empirically. In some embodiments, these curves may be determined via a model. The frequency of the empty container may be a function of only the bottle itself. The frequency of the full container may be a function of the bottle and whatever fluid is in the container.

In some embodiments, this information (full frequency, and optionally empty frequency or type of fluid inside) may be received by one or more processor(s). In some embodiments, this may be received from an RFID chip, or 2D or 3D barcode (such as a QR code).

In some embodiments, the container may be unknown, but the fluid may be known (for example, one may know that a full container of $CO_2$ is present. In some embodiments, given a full container and knowledge of the fluid, the method may include determining the empty bottle frequency (e.g., either by being given the full frequency, or measuring a frequency when the container is "full", then adjusting that frequency based on a known curve for the frequency for the given liquid). As will be understood, the reverse calculation can also occur. That is, given (or measuring) an empty container frequency, and with knowledge of the fluid inside a full container, the frequency of a full container can be determined.

With at least a full frequency and an empty frequency or a type of fluid, the method can estimate the fill level of the container at any given point. As will be understood, the accuracy is improved when the curve of the fluid is empirically determined.

In some embodiments, the method may include determining if an expected container has been put into place. That is, if a system is expecting fluid from a 10-gallon container, and a 1 gallon container is provided, there may be problems or concerns. As such, in some embodiments, the method may include taking certain actions whenever a container is first coupled to a system.

If a full (or empty) container is expected, the method may include determining a resonance frequency and comparing that frequency to an expected frequency for a full (or empty) container. If frequencies do not match (within a predetermined level of accuracy, such as +a fixed amount, or +a certain percentage), the method may include generating an alert and/or preventing fluid from being withdrawn from the container. For example, an alert could tell a user to insert an appropriate bottle. In some embodiments, the processor(s) may generate an alert if a container is not present. In some embodiments, the processor(s) may generate an alert if an expected container is not present.

In some embodiments there may be more than one appropriate bottle. The frequency for a full bottle can then be used to identify which of the appropriate bottles is inserted. Further it can identify if a bottle other than the appropriate bottles is inserted.

Figure 5:
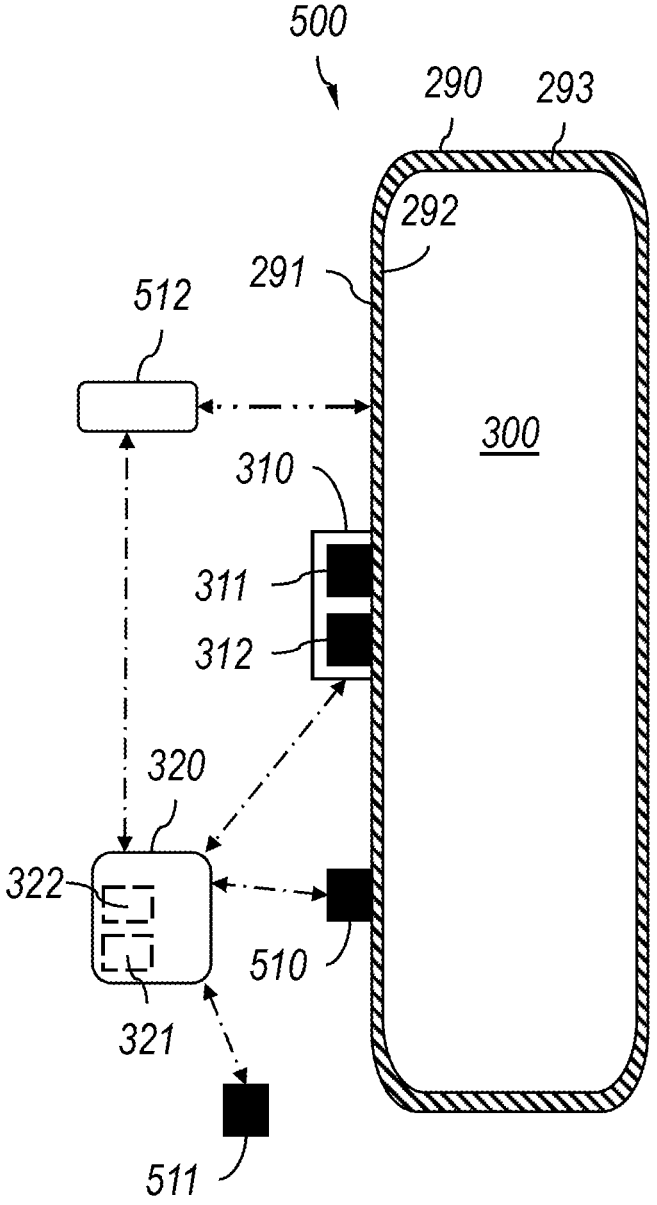
FIG. 5 is a schematic illustration of an embodiment of a system for determining mass of a fluid within a container.

A sensor system that can be used with the disclosed method can be seen with reference to FIG. 5. In some embodiments, a sensor system 500 includes an activation and detection subsystem 310 configured to be positioned on an external surface 291 of a container 290 containing a fluid 300.

As disclosed herein, the fluid may be in a variety of states. In some embodiments, the container may be filled with a compressed fluid. In some embodiments, the container may be filled with a liquid. In some embodiments, the container may be filled with a gas. In some embodiments, the container may be partially filled with a gas (e.g., a gas phase of a material) and the remainder may be filled with a liquid (e.g., the liquid phase of the material). In some embodiments, the container may be filled with a supercritical fluid. In some embodiments the container may be filled with a gas-mixture. The fluid may be, e.g., a liquified petroleum gas such as propane and/or butane. The fluid may be, e.g., a compressed gas such as air, $CO_2$, $N_2$, $O_2$, etc.

As disclosed herein, the activation and detection subsystem may be configured to (i) cause a vibration at a desired range of frequencies at the external surface of the container; and then (ii) receive vibration data at the external surface of the container responsive to the caused vibration. In some embodiments the vibration data is an acoustic signal.

In some embodiments, the activation and detection subsystem may include two separate components, one for activating and one for detecting.

In some embodiments, the actuation is performed using a combination of several frequencies.

In some embodiments the actuation is done using a voice-coil actuator.

In some embodiments the actuation is done using an actuator outputting noise. The term "noise" may refer to an expression of a large range of frequencies, such as white noise. White noise can generally be understood as a random acoustic stimulus represented by waveform with a flat power spectral density.

Figure 6A:
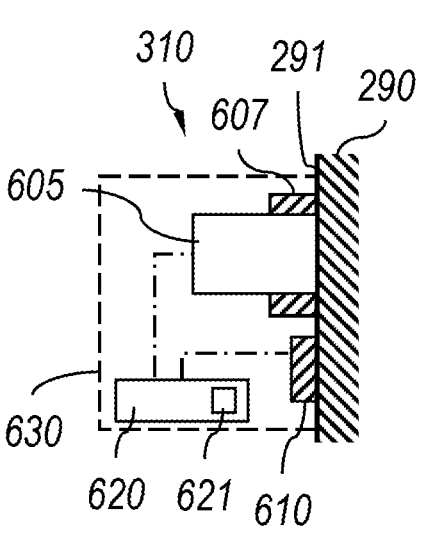
FIGS. 6A-6D are simplified cross-sections of activation and detection subsystems.

Referring to FIG. 6A, in some embodiments, the activation and detection subsystem 310 may include a voice-coil actuator 605 capable of vibrating at a range of desired frequencies, as well as a microphone 610 capable of receiving data. In some embodiments the microphone is not in direct contact with the container. In some embodiments, both transducers (e.g., voice-coil actuator 605 and microphone 610) may operably communicate with circuitry 620. Circuitry 620 may comprise a processor 621. In some embodiments, the activation and detection subsystem 600 may include housing 630 that is configured to encompass (or cover) some or all of the other components of the activation and detection subsystem 600. In some embodiments, as disclosed herein, an elastic material 607 may be disposed around a portion of the voice-coil actuator, and the elastic material may be deformed slightly by having a slight force applied to it by the container, ensuring the voice-coil actuator is in contact with the container.

Figure 6B:
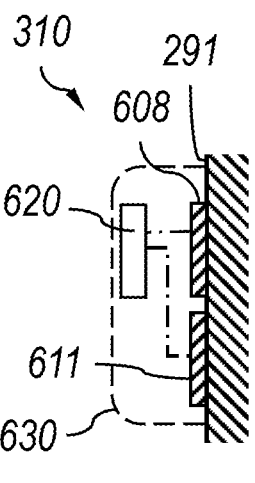

Referring to FIG. 6B, in some embodiments, the activation and detection subsystem 600 may include a first piezoelectric or piezoresistive transducer 608 capable of vibrating at a desired frequency, as well as a second piezoelectric or piezoresistive transducer 611 capable of receiving data. In some embodiments, both transducers 608, 611 operably communicate with circuitry 620.

Figure 6C:
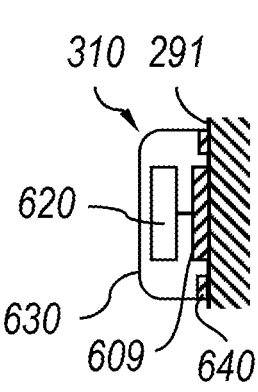

In some embodiments, the activation and detection subsystem may include a single component capable of both actuating and detecting. As seen in FIG. 6C, the activation and detection subsystem 310 may include a single piezoelectric or piezoresistive transducer 609, that is capable of being configured to vibrate at a desired frequency, and then quickly reconfigured to receive vibration data from the piezoelectric or piezoresistive transducer.

In some embodiments the activation and detection subsystem may include one voice coil actuator and one or more microphones. In some embodiments, the activation and detection subsystem may include a single voice coil actuator and a single microphone. In some embodiments, the activation and detection subsystem may include a single voice coil actuator and a plurality of microphones.

In some embodiments the activation and detection subsystem may include one voice coil actuator and one or more vibrations sensors. In some embodiments, the activation and detection subsystem may include a single voice coil actuator and a single vibration sensor. In some embodiments, the activation and detection subsystem may include a single voice coil actuator and a plurality of vibration sensors.

In some embodiments, the activation and detection subsystem may include one or more connectors 640. Such connectors allow the subsystem to be connected to a container. Thus, the connectors may be, e.g., an adhesive layer or magnets configured to hold the subsystem to a tank, or threads configured to interact with reciprocal threading on the tank.

Figure 6D:
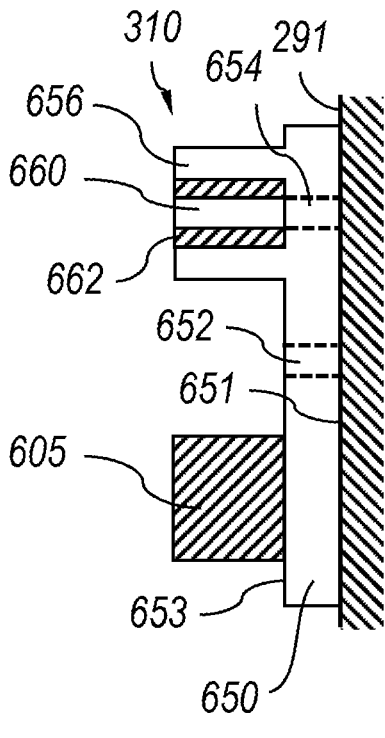
Figure 6E:
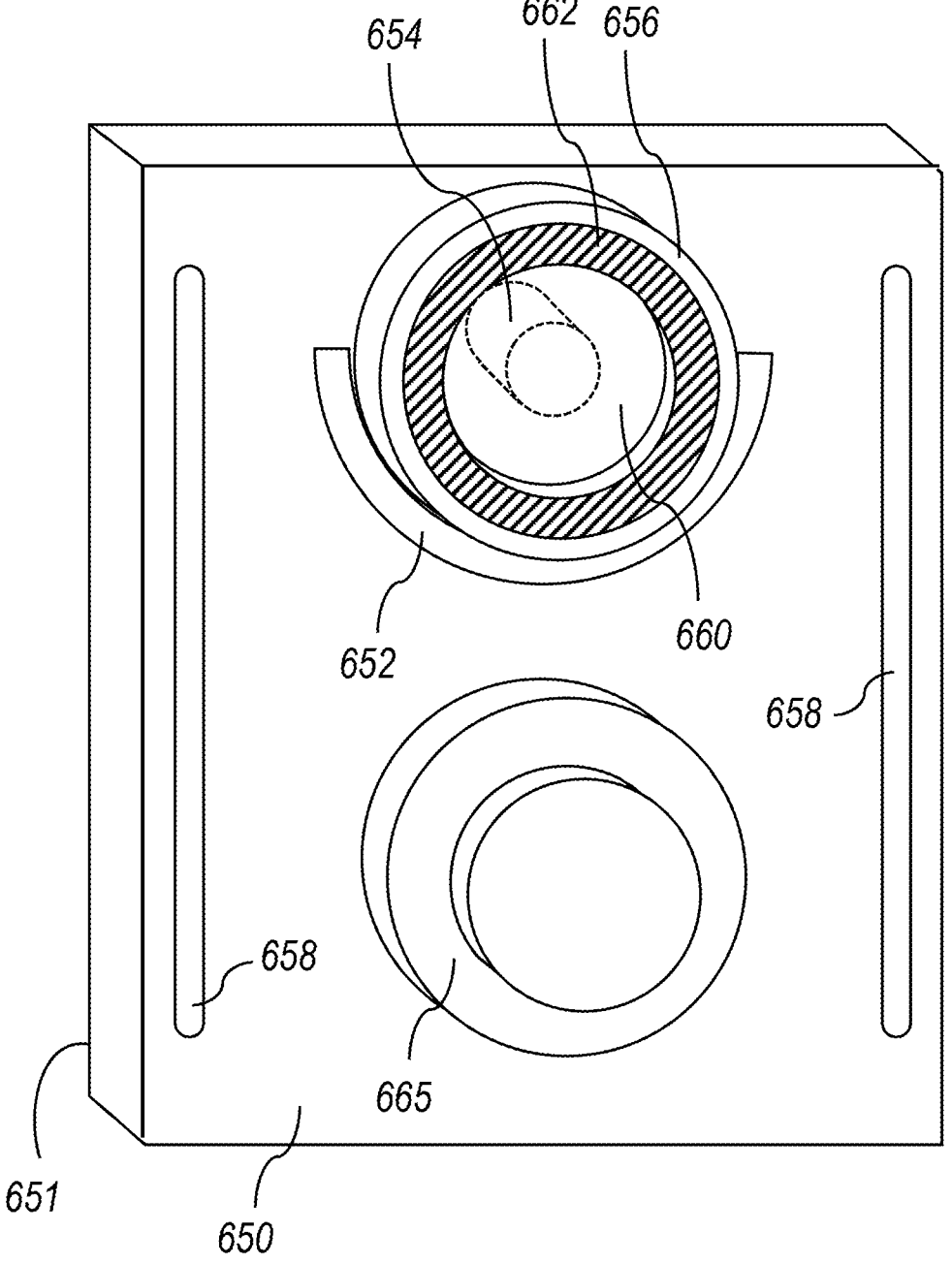
FIG. 6E is an example of an illustration of an activation and detection subsystem of FIG. 6D.

Referring to FIG. 6D-6E, in some embodiments, the activation and detection subsystem 310 may include a relatively thin, relatively stiff substrate 650 that is configured to contact the bottle. A voice coil actuator 605 (or piezo-electric) may be coupled to the substrate 650. The substrate may include one or more portions 656 that extend outward, away from a first surface 651 configured to be in contact with the external surface 291 of the container. The one or more portions may be disposed around a microphone 660. Microphone 660 may be disposed within an elastic material 662 that is positioned within the one or more portions 656 of the substrate that extend outward. In that manner, the substrate may "hold" the elastic material and the microphone in place over an opening 654 that extends from the first surface 651 to a second surface 653 opposite the first surface. A slit 652 extending from the first surface 651 to the second surface 653 may be included between the microphone and the voice coil to reduce mechanical coupling between the voice coil and the microphone. The substrate 650 may include one or more side slits 658 to allow, e.g., a belt or strap to be coupled to the substrate in order to hold the device in place on a container.

Figure 7:
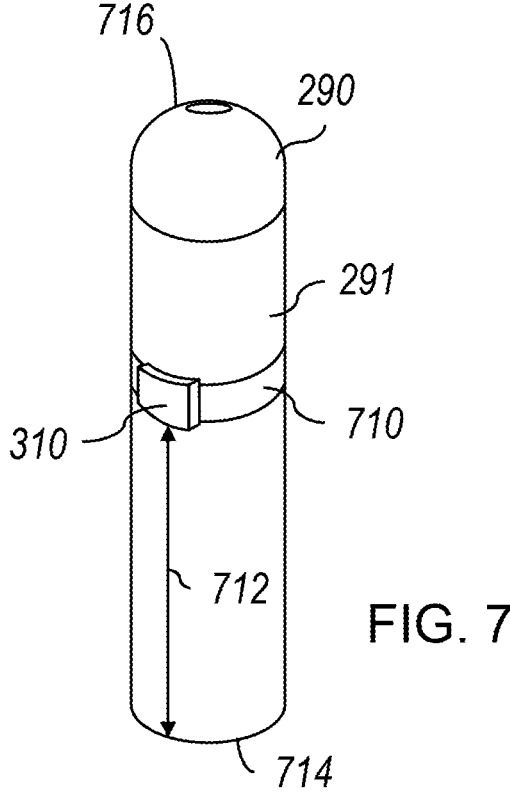
FIG. 7 is an illustration of a container with an activation and detection subsystem coupled to the external surface.

Referring to FIG. 7, as can be seen, the activation and detection subsystem 310 may be coupled to an external surface 291 of a container 290. In some embodiments, the activation and detection subsystem may be disposed a distance 712 from an end of a container (such as a downward-facing end 714 and/or an upward-facing end 716 (which may be an end at which a port or valve is disposed). In some embodiments, the activation and detection subsystem may be disposed at a location approximately at the center of the container (e.g., ±5% from a point midway along a height of the container). In some embodiments the microphone is configured to be disposed at a distance from a top or bottom of the container, the distance being approximately ¼ the height of the container. In some embodiments one microphone is configured to be disposed at a distance from a top or bottom of the container, the distance being about ¼ the height of the container, and another microphone is configured to be disposed at a distance from a top or bottom of the container, the distance being about half the height of the container. In some embodiments, at least one vibration sensor or microphone is configured to be disposed above or below the actuator (e.g., relative to a length axis of the container, where the bottom of the container is "down" and the top of the container is "up").

In some embodiments, the actuating element and the detector may be on the same "side" of the container. In some embodiments, the container may be disposed between the actuator and the detector.

In some embodiments, the activation and detection subsystem may be in contact with the container, but not affixed the container. For example, the subsystem may be pressed against an external surface of the container. In some embodiments, the activation and detection subsystem may be removably attached to the container. In some embodiments, the activation and detection subsystem may be permanently attached to the container. It should be understood that even if the activation and detection subsystem is in contact with the container, the detection system may not be in contact. In some embodiments, the activation and detection subsystem may be attached to the container via a clamp. In some embodiments, the activation and detection subsystem may be attached to the container via a strap or belt 710, which may include an elastomeric material. In some embodiments, the strap or belt may be coupled to the activation and detection subsystem via one or more connectors 640 (not shown in FIG. 7). In some embodiments the container is pushing against the activation and detection subsystem.

Figure 8:
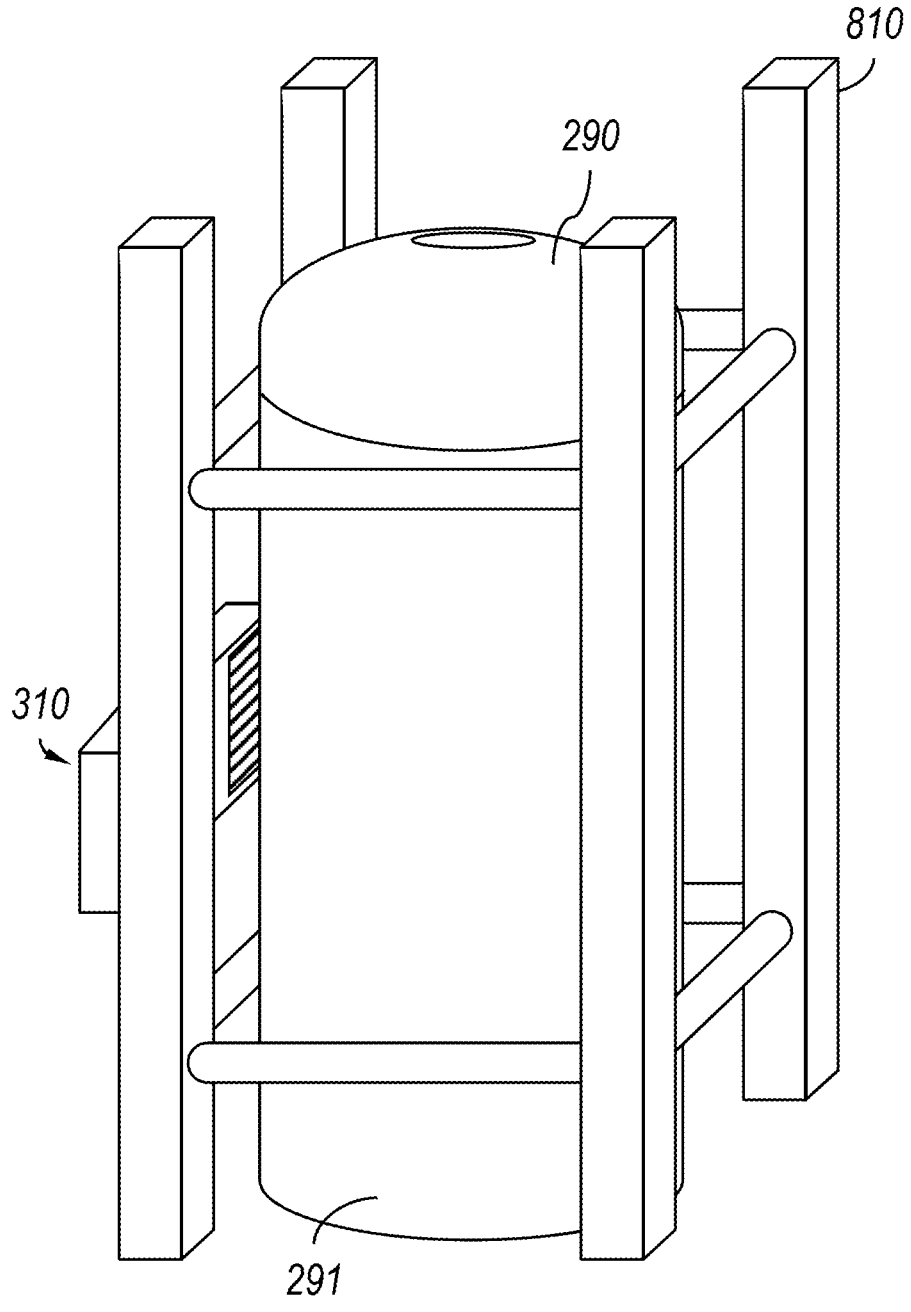
FIG. 8 is an illustration of an embodiment of a system.

Referring to FIG. 8, the activation and detection subsystem 310 may be coupled to a structure 810 (which may an "intermediate structure") configured to hold or position the container 290 such that the activation and detection subsystem 310 is positioned at or near an external surface 291 of the container. In some embodiments, the vibration device is operably connected to the intermediate structure, where the intermediate structure is in contact with the external surface 291 of the container. In some embodiments, the intermediate structure is configured to hold the container in contact with, and preferably slightly under compression with, the activation and detection subsystem. In some embodiments the activation subsystem may be connected to a structure that is connected to the container such that vibrations may be transferred from the actuator, through the structure, to the container.

Figure 9A:
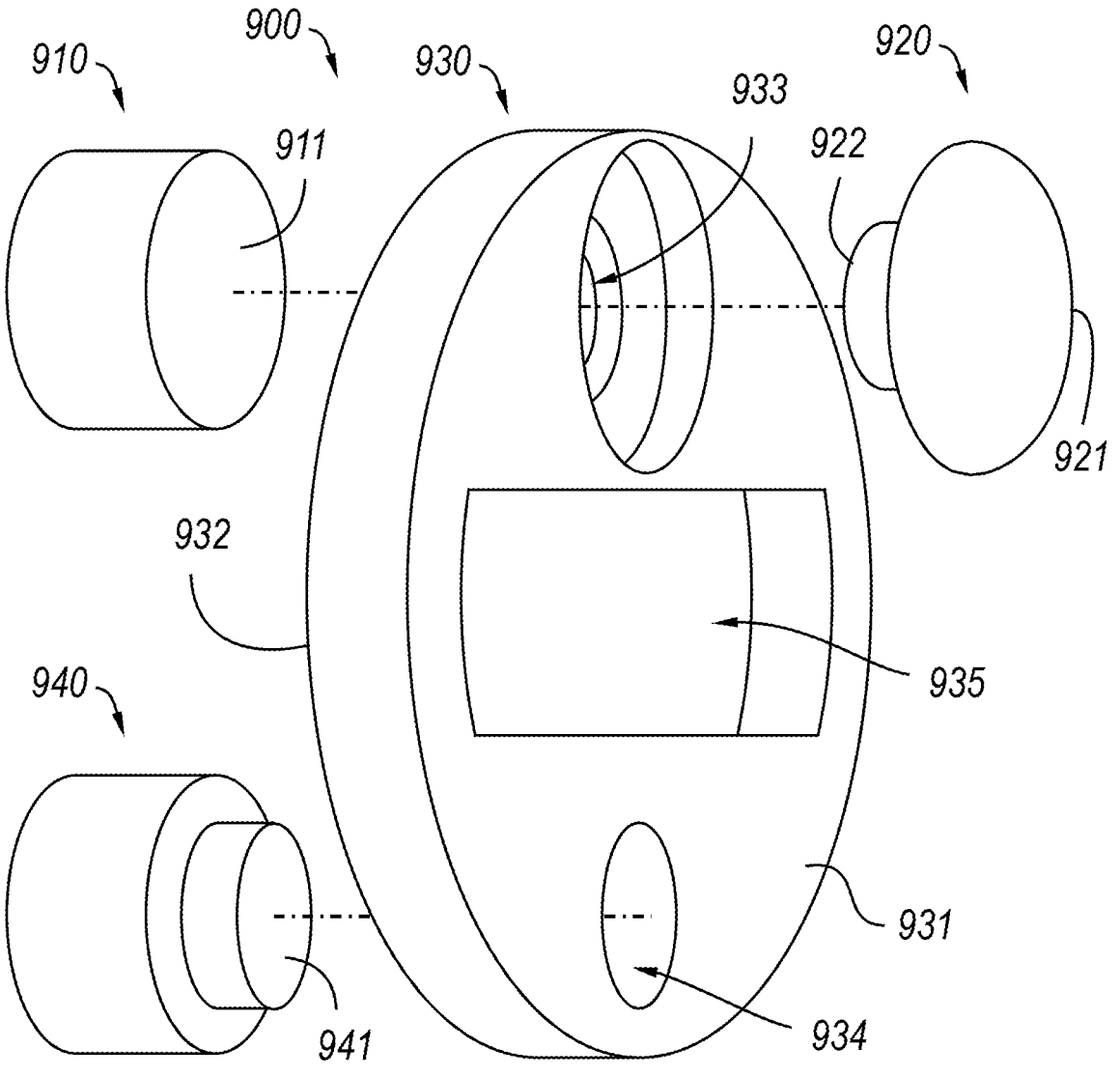
FIGS. 9A-9C are illustrations of an embodiment of an activation and detection subsystem.

Referring to FIG. 9A, some embodiments of an activation and detection subsystem 900 may include various components. The subsystem may include an actuator. The actuator may include an actuating element 910. The actuating element may be any appropriate component configured to generate the necessary vibrations. This may be, e.g., a voice coil actuator.

The actuator may include a contact element 920. The contact element may have a first surface 921 configured to contact a container, to cause the necessary vibrations. The contact element may have a second surface 922, opposite the first surface, that may be configured to be operably coupled to a surface 911 of the actuating element 910. In some embodiments, the contact element may be cylindrical. In some embodiments, the contact element may be mushroom-shaped. In some embodiments, the contact element may have a first surface that is convex. In some embodiments, the contact element may have a first surface that is flat. In some embodiments, the contact element may have a first surface that has one or more inflections points in its curvature.

The activation and detection subsystem may include an elastic substrate 930. The elastic substrate may reduce the mechanical interference between the actuator and the detector. The container may exert a force on contact surface. The container may exert a force on the elastic surface. The elastic surface may be deformed when in contact with the container to ensure a positive contact force between the contact element 920 (or contact surface, including whatever surface is used to transmit vibrations to the container) and the container. The elastic substrate may have a first surface 931 and a second surface 932 opposite the first surface. The elastic substrate may have one or more openings 933, 934, 935 extending from the first surface to the second surface. In some embodiments, the contact element 920 may be coupled to the actuating element 910 via a first opening 933. In some embodiments, at least a portion of the contact element may be disposed within the first opening.

The activation and detection subsystem may include a detector 940 for receiving vibration data, such as a microphone. At least a portion of the microphone may be configured to extend at least partially through a second opening 934 of the clastic substrate. In some embodiments, at least a portion of the microphone may be configured to extend through a second opening 934 of the elastic substrate. In some embodiments, a surface 941 of the microphone may be substantially flush with a first surface 931 of the elastic substrate. In some embodiments the microphone may not be in contact with the container.

In some embodiments, one or more third opening(s) 935 may be present in the elastic substrate. In some embodiments, the third opening(s) may be configured to improve the mechanical isolation of the microphone from the actuator, as compared to an elastic substrate without the third opening(s). In some embodiments, at least one opening is disposed between the first opening 933 and the second opening 934.

In some embodiments, the activation and detection subsystem may be formed via molding. In some embodiments, the activation and detection subsystem may be overmolded. In some embodiments, the overmolding may use two-shot molding.

In some embodiments, the first surface 931 of the elastic substrate may be flat. In some embodiments, the first surface may be concave. In some embodiments, the first surface may be contoured to match an external surface of a container the activation and detection subsystem is intended to be used with. For example, in some embodiments, a radius of curvature of first surface may be no less than a radius of curvature of an external surface of a container the activation and detection subsystem is intended to be used with.

Figure 9B:
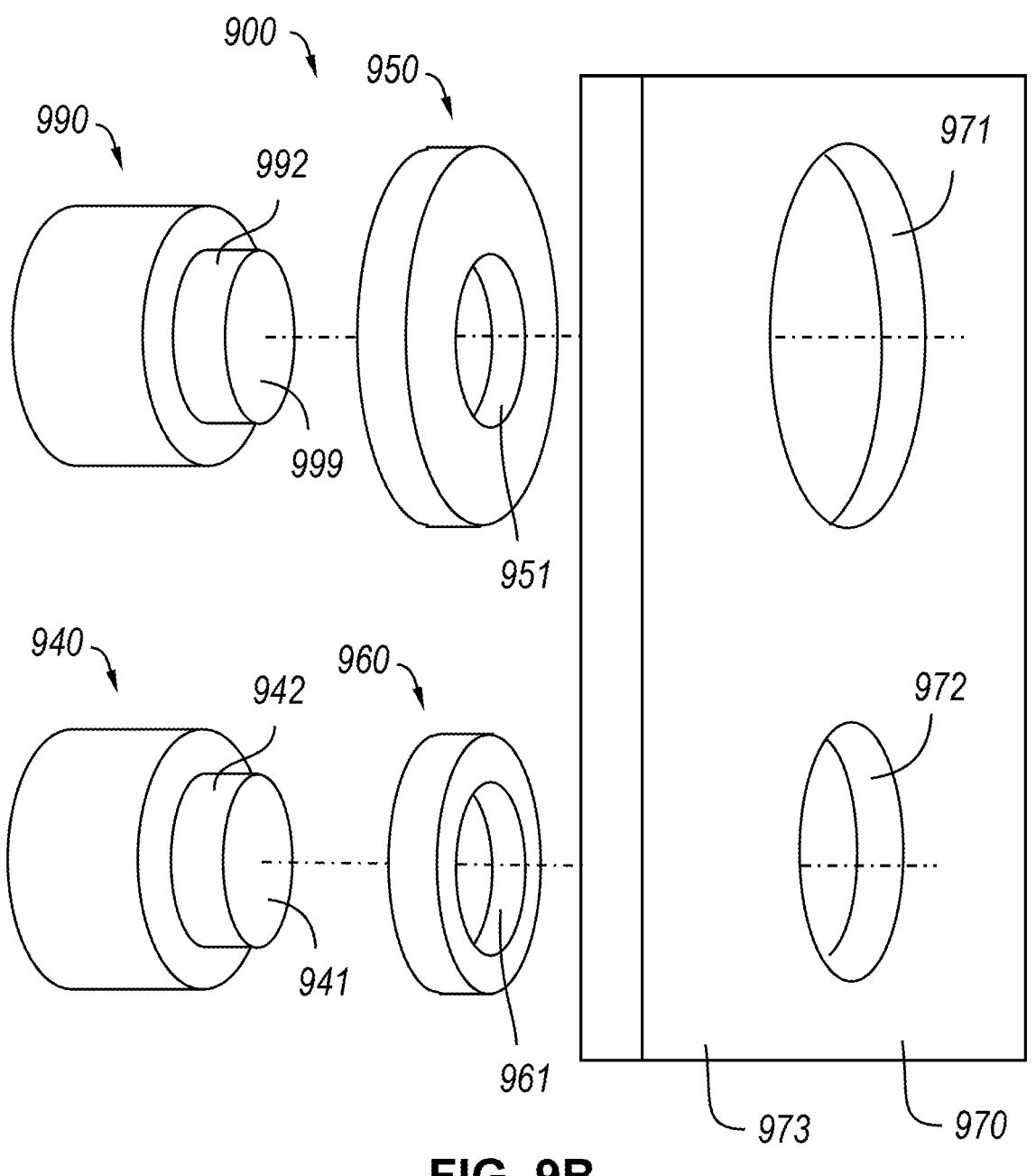

Referring to FIG. 9B, the activation and detection subsystem may include a stiff substrate 970. As used herein, the term "stiff" is used in its ordinary sense, including, without limitation, to refer to a material not easily bent, lacking in suppleness or responsiveness.

The substrate may define one or more openings 971, 972 extending from one surface to an opposite surface of the stiff substrate. The stiff substrate may be used to attach the activation and detection subsystem to an external structure. For example, in some embodiments, an external structure may only contact a first surface 973 of the stiff substrate. Alternatively, in some embodiments, an external structure may contact a first surface 973 of the stiff substrate and the first clastic substrate 950 and/or the second elastic substrate 960.

The activation and detection subsystem may include a first elastic substrate 950. The first elastic substrate may be configured to reduce the mechanical interference between the actuator and the detector. The first elastic substrate may be disposed around a portion 992 of the actuating element 990, In some embodiments, actuating element may be, e.g., actuating element 910. In some embodiments, actuating element may be, e.g., actuating element 910 and contact element 920.

The first elastic substrate may be deformed when in contact with the container to ensure a positive contact force between a surface 999 of the actuator and the container. Surface 999 may be a surface of the actuating element 990. Surface 999 may be a contact surface of a contacting element (not shown). In some embodiments, surface 999 of the actuating element may be substantially flush with a first surface 973 of the stiff substrate. In some embodiments, surface 999 of the actuating element may be disposed a distance in the normal direction from the first surface 973 of the stiff substrate.

The first elastic substrate may be configured to be disposed at least partially within one of the one or more openings 971, 972 of the stiff substrate. The first elastic substrate may have a first substrate opening 951 extending from a first surface to a second surface opposite the first surface. In some embodiments, the first substrate opening and the opening (e.g., one of the one or more openings 971, 972) in the stiff substrate that the first elastic substrate is disposed within may be coaxial. In some embodiments, the first substrate opening and the opening (e.g., one of the one or more openings 971, 972) in the stiff substrate that the first elastic substrate is disposed within may be parallel but not coaxial.

The activation and detection subsystem may optionally include a second elastic substrate 960. The second elastic substrate may be configured to reduce the mechanical interference between the actuator and the detector. The second elastic substrate may be disposed around a portion 942 of the detector 940. In some embodiments, a surface 941 of the detector may be substantially flush with a first surface 973 of the stiff substrate.

The second elastic substrate may be configured to be disposed at least partially within one of the one or more openings 971, 972 of the stiff substrate. The second elastic substrate may have a second substrate opening 961 extending from a first surface to a second surface opposite the first surface. In some embodiments, the second substrate opening and the opening (e.g., one of the one or more openings 971, 972) in the stiff substrate that the second elastic substrate is disposed within may be coaxial. In some embodiments, the second substrate opening and the opening (e.g., one of the one or more openings 971, 972) in the stiff substrate that the second elastic substrate is disposed within may be parallel but not coaxial.

Figure 9C:
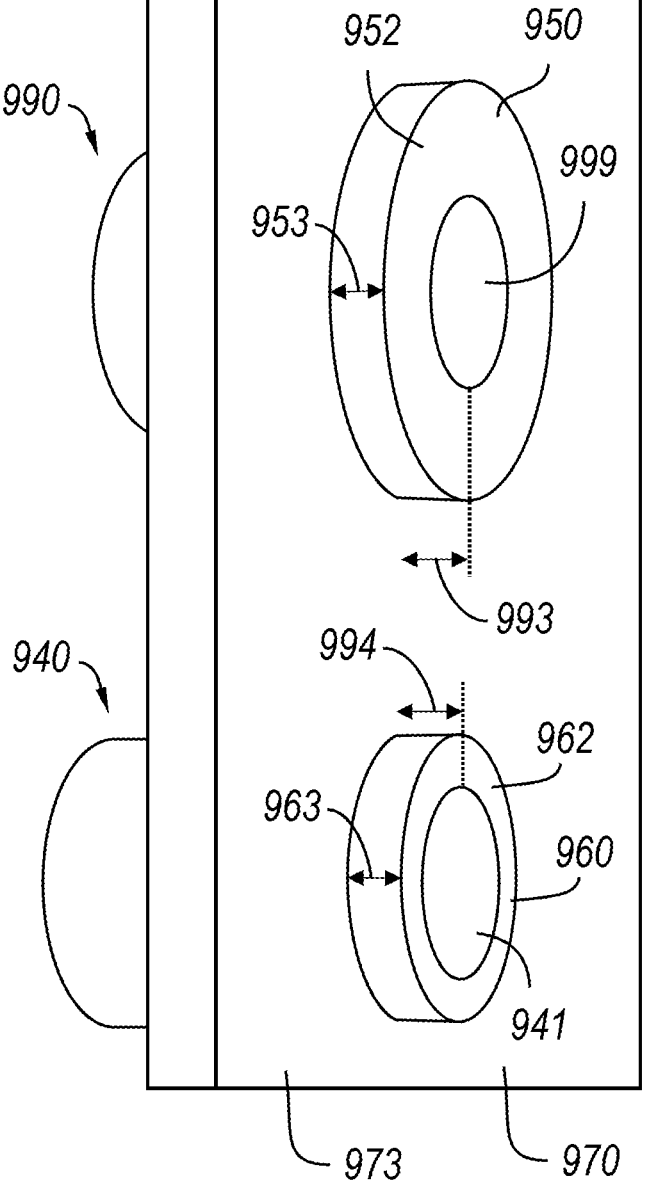

Referring briefly to FIG. 9C, the positioning the various relevant surfaces may vary. In some embodiments, surface 999 (e.g., a surface configured to be closest to a container) of the actuating element 990 may be disposed a distance 993 ("d1") in the normal direction from the first surface 973 of the stiff substrate. In some embodiments, surface 952 of the first elastic substrate 950 may be disposed a distance 953 ("d2") in the normal direction from the first surface 973 of the stuff substrate. In some embodiments, d1>d2. In some embodiments, d1=d2. In some embodiments, d1<d2. In some embodiments, d1 and d2 are less than 10 mm. In some embodiments, d1 and d2 are less than 5 mm. In some embodiments, d1 and d2 are less than 3 mm.

In some embodiments, surface 941 of the detector 940 may be disposed a distance 994 ("d3") in the normal direction from the first surface 973 of the stiff substrate. In some embodiments, surface 962 of the second elastic substrate may be disposed a distance 963 ("d4") in the normal direction from the first surface 973 of the stiff substrate. In some embodiments, d3>d4. In some embodiments, d3=d4. In some embodiments, d3<d4. In some embodiments, d3 and d4 are less than 10 mm. In some embodiments, d3 and d4 are less than 5 mm. In some embodiments, d3 and d4 are less than 3 mm. In some embodiments, d1<d3. In some embodiments, d1=d3. In some embodiments, d1>d3. In some embodiments, d1 and/or d2 are less than 0 mm, meaning that they are below the surface 973.

In some embodiments, a cross-sectional area (in a plane perpendicular to the central axis) of the second elastic substrate is at least as large as a cross-sectional area (in a plane perpendicular to the central axis) of the first elastic substrate. For example, referring to FIG. 9C, in some embodiments, surface 962 of the second elastic substrate may have an area at least as large as the area of surface 952 of the first elastic substrate. In some embodiments, a cross-sectional area (in a plane perpendicular to the central axis) of the second elastic substrate is less than as a cross-sectional area (in a plane perpendicular to the central axis) of the first elastic substrate. In some embodiments, the subsystem is free of a second elastic substrate.

The stiff substrate may have a stiffness that is greater than a stiffness of the first and second elastic substrates.

Referring to FIG. 5, the sensor system 500 may also include one or more sensors 510, 511. The sensor may be a contact temperature sensor. The temperature sensor may be a non-contact temperature sensor. The sensor may be a pressure sensor configured to measure a pressure of the fluid.

While not shown, it will be readily understood that in some embodiments, the sensor(s) maybe within a housing, and optionally within a housing that also encompasses at least a part of the activation and/or detection subsystem 310. In a preferred embodiment, only a single activation and detection subsystem may be present in the system. In some embodiments, the temperature sensor 510 may be directly connected to an external surface 291 of the container. In some embodiments, the temperature sensor 511 may be remote from the container. In some embodiments, the temperature sensor is a handheld temperature sensor 512. In some embodiments, only a single temperature sensor may be utilized. In some embodiments, a plurality of temperature sensors may be utilized.

The activation and detection subsystem and the temperature sensor(s) are configured to operably communicate with one or more processors 321, such as one or more processors in a remote controller 320.

The term "processor" is used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the processor may execute one or more software or firmware programs to provide at least some of the described functionality. The term "processor" may also refer to a combination of one or more hardware elements (such as a combination of circuits used in an electrical or electronic system) with the program code used to carry out the functionality of that program code. The term "processor" may also refer to one or more application processors, one or more baseband processors, a physical central processing unit (CPU), a single-core processor, a dual-core processor, a triple-core processor, a quad-core processor, and/or any other device, or combination of devices, capable of executing or otherwise operating (either individually or as a combined unit of processing components), collectively, computer-executable instructions such as program code, software modules, and/or functional processes.

In some embodiments, the remote controller 320 may be, or may include, e.g., a mobile device, such as a mobile phone, tablet, or laptop. In some embodiments, the remote controller 320 may be, or may include, e.g., desktop computer or a remote server. In some embodiments, the remote controller 320 may be, or may include, e.g., custom circuitry for controlling a process. In some embodiments, all processor(s) may be present on a single device. In some embodiments, one or more processor(s) may be present on a first device and one or more processor(s) may be present on a second device. The processor(s) may be coupled to various components, as understood in the art, including, e.g., a non-transitory computer readable storage device. In some embodiments, one or more processor(s) may be on a mobile device. In some embodiments, one or more processor(s) may be based on a remote server.

In some embodiments, the activation and detection subsystem communicates wirelessly with the processor(s). In some embodiments, the activation and detection subsystem communicates electrically with the processor(s). In some embodiments, the activation and detection subsystem is powered wirelessly.

In some embodiments, one or more temperature sensors communicate wirelessly with the processor(s). In some embodiments, one or more temperature sensors communicate electrically with the processor(s).

The system may also contain a non-transitory computer readable storage device 322 operably communicating with the processor, the storage device containing instructions for configuring the processor to perform several tasks, such as those tasks disclosed herein.

In some embodiments, the processor(s) may be configured to control the system and ensure the performance of a method as disclosed herein.

In some embodiments, the processor(s) may be configured to cause the activation and detection subsystem 310 to activate, causing a vibration on an external surface of the container as disclosed herein.

In some embodiments, the processor(s) may be configured to receive (i) vibration data from the activation and detection subsystem and (ii) a temperature from the temperature sensor, as disclosed herein.

In some embodiments, the processor(s) may be configured to convert the vibration data into one or more frequencies as disclosed herein.

In some embodiments, the processor(s) may be configured to estimate a mass of the fluid based on the one or more frequencies and the temperature, as disclosed herein.

In some embodiments, the processor(s) may be configured to generate an alert or request a replacement container when the estimated mass is at or below a first predetermined threshold. The alert may be a visible or audio alert local to the container, or may be an alert at a remote location.

In some embodiments, the processor(s) may be configured to determine a rate at which the estimated mass within the container is changing. In some embodiments, the rate may be determined over an arbitrary length of time that may be selected by a user (i.e., the processors may be configured to receive input from a user, the input including a period of time over which to determine a rate of change, such as rate of change over a 5-minute period, etc.). In some embodiments, the rate may be determined based on a single use or a fixed number of uses. As one example, if the fluid in the container is being used to fill consumer goods in bottles, the rate of change may be determined based on the rate of change for filling a single bottle, or the rate of change for filling one hundred bottles. The rate of change may be compared to a target range, and an alert may be generated if the rate of change is outside the target range-filling too fast or too slow may indicate, for example, a mechanical problem or a clogged line.

In some embodiments, the rate of change of mass within the container may be tracked. The system may use the rate of change to determine if the container is being used, or used as intended. In some embodiments, an alert may be generated if the container is determined as not being emptied as frequently as expected. In some embodiments, an alert may be generated if the container is determined to not being emptied at an expected rate. For example, if a medical oxygen container is begin monitored, and the system determines the amount of mass in the container is changing less than a predetermined threshold (e.g., less than 75%, or less than 50%, of a predetermined expected rate of change) over a predetermined time window (e.g., 2 hours, 4 hours, 8 hours, 24 hours, etc.), the system may generate an alert. The alert may be sent to, e.g., a remote user (such as a doctor or caregiver).

In some embodiments, the processor(s) may be configured to estimate a date and/or time at which the mass of within the container will be at or below a predetermined threshold. In some embodiments, the processor(s) may be configured to estimate a date and/or time at which the mass of within the container will be below a predetermined threshold. For example, in some embodiments, the processor may use estimated mass, and a determined rate at which the mass is changing, to estimate a time when the current container will be below, e.g., 100 g of fluid.

In some embodiments, the processor(s) may be configured to estimate a date and/or time at which the mass within the container will be at or below a predetermined threshold. In some embodiments, the processor(s) may be configured to estimate a date and/or time at which the mass within the container will be below a predetermined threshold. For example, in some embodiments, the processor(s) may use estimated mass, and a determined rate at which the mass is changing, to estimate a time when the current container will be empty.

In some embodiments, this estimated time is displayed or sent to a user.

In some embodiments, the processor(s) may be configured to store a date and/or time and the estimated mass on the non-transitory computer readable storage device (e.g., such as in a database).

In some embodiments, the processor(s) may utilize this estimated time to automatically generate tasks.

For example, in some embodiments, the processor is configured to generate an alert and/or request a task be performed when an estimated date and/or time to reach a particular threshold differs from a current date and/or time by less than a predetermined amount of time (or is within a certain predetermined range of time).

For example, if the processor(s) determines a container will be below a threshold amount of 5 L of fluid at a time that is less than 1 hour from the current time, the processor may generate an alert and send a request for replacement container. In some embodiments, the processor(s) may automatically request maintenance assistance, when the mass is below a predetermined threshold. In some embodiments, the processor(s) may automatically request or order a new container to be delivered and/or installed.

For example, in some embodiments, if the estimated time to empty is within a first range of time (e.g., more than 4 hours away, but less than 8 hours away), the processor may automatically generate a work request, which may be sent to a user, requesting that a replacement container be made available on-site prior to the estimated time to empty, as well as requesting the removal of the empty container at a time point after the container is estimated to be empty.

The predetermined threshold for the amount of time may be set by a user, or may be determined based on data. For example, if the system is configured to store (i) dates and/or times the alerts are generated, (ii) dates and/or times the containers are actually empty, are replaced, or are refilled, and optionally (iii) dates and/or times that a container replacement is ordered or scheduled (if not the same as (i)), the processor(s) may be configured to automatically determine the average response time for replacing a container, and based on that average response time, may be configured to determine a predetermined threshold (and/or adjust it as needed).

In some embodiments, the system can be configured to determine slow leaks of the gas by detecting abnormal changes in the detected resonance frequency. This could be done through a learning procedure, where the change in frequency during normal usage is learned. If changes in the frequency outside of what is expected are detected it can be determined that there is a leak in the system.

In some embodiments, the activation and detection subsystem may include a battery. In some embodiments, activation and detection subsystem may be coupled to an external power source (such as via a power cord connected to an A/C outlet, a DC power, or hardwired to an electrical service in a building). In some embodiments RFID is used to power the activation and detection subsystem.

Figure 10A:
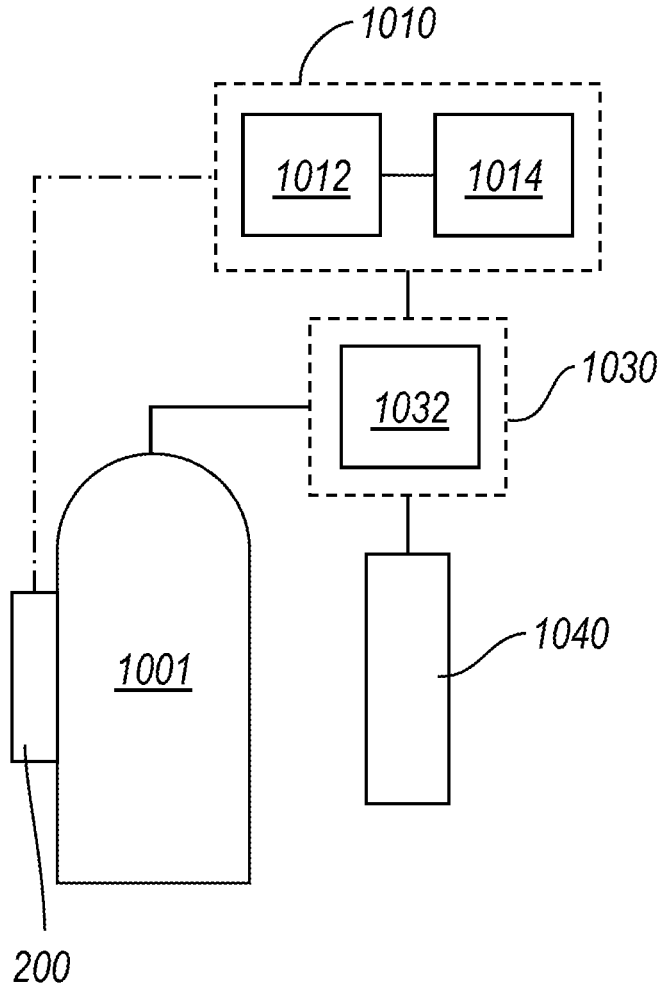
FIGS. 10A and 10B are illustrations of alternate embodiments of a system.

Referring to FIG. 10A, a simplified schematic of a beverage system in use can be seen. A first removable container 1001 that contains a first fluid (such as $CO_2$), with a sensor system 200 as disclosed herein in contact with an external surface can be seen. Housings, etc., are not shown, for simplicity. A controller 1010 with one or more processor(s) 1012 and a non-transitory computer readable storage device 1014 operably control the system, including receiving information from the sensor system 200. The first container is operably coupled to a dispenser 1030, the dispenser configured to control (e.g., via one or more valves 1032, and optionally via one or more nozzles (not shown)) the flow of the first fluid to a removably coupled container 1040 (such as a bottle).

Figure 10B:
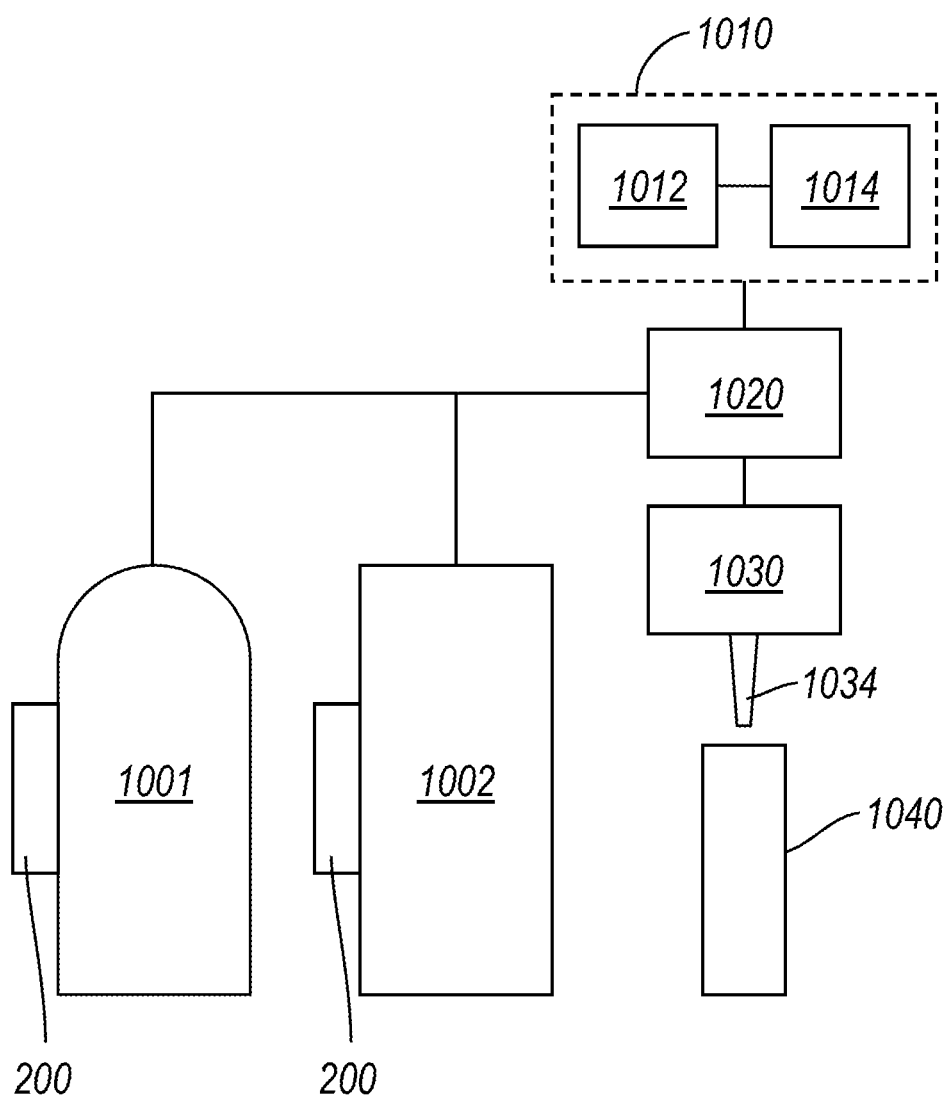

Referring to FIG. 10B, a simplified schematic of an alternate beverage system in use can be seen. A first removable container 1001 that contains a first fluid (such as $N_2$, $CO_2$, etc.), with a sensor system 200 as disclosed herein in contact with an external surface can be seen. A second removable container 1002 that contains a second fluid (such as a premixed concentrate, syrup, water, etc.), with a sensor system 200 as disclosed herein in contact with an external surface can be seen. A controller 1010 with one or more processor(s) 1012 and a non-transitory computer readable storage device 1014 operably control the system, including receiving information from the sensor system 200. The first container is operably coupled to a mixing chamber 1020 to allow and/or cause the first fluid to mix with the second fluid. The mixture is then sent to a dispenser 1030, the dispenser configured to control (optionally via one or more valves (not shown) and/or one or more nozzles 1034) the flow of the mixture of fluids to a removably coupled container 1040 (such as a bottle, cup, etc.).

In FIGS. 11A and 11B, a system can be seen. In FIG. 11A, a housing 1100 may be provided, that has a slot 1110 or connector configured to receive a portion of a container 290, and ensure the container is in an appropriate position. As shown in FIG. 11B, when the container has been inserted into the slot or connector, the container is held firmly against the activation and detection subsystem 310, such that an actuator (here, voice-coil actuator 305) is held against the container, and a detector (here, microphone 610) is appropriately placed to receive the vibration data. As will be understood, in some embodiments the container may be held in place at additional or different locations. For example, in some embodiments, the container may be held at the top instead of the bottom as shown in FIGS. 11A and 11B.

As will be understood, the sensor system can be used in numerous other applications.

Embodiments of the present disclosure are described in detail with reference to the figures wherein like reference numerals identify similar or identical elements. It is to be understood that the disclosed embodiments are merely examples of the disclosure, which may be embodied in various forms. Well known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Those skilled in the art will recognize or be able to ascertain using no more than routine experimentation many equivalents to the specific embodiments of the invention described herein. Such equivalents are intended to be encompassed by the following claims.

What is claimed is:

1. A sensor system, comprising:

an activation and detection subsystem configured to be positioned on an external surface of a container containing a fluid, the activation and detection subsystem configured to not move relative to the container, and the activation and detection subsystem further configured to:

cause a vibration at a range of predetermined frequencies at the external surface of the container; and receive vibration data—at or near the external surface of the container; and one or more processors operably communicating with the activation and detection subsystem, the one or more processors configured to, collectively:

receive the vibration data from the activation and detection subsystem;

convert the vibration data into one or more resonance frequencies related to the range of predetermined frequencies; and determine an estimated mass or fill level of the fluid based on the one or more resonance frequencies by applying a calibration curve;

wherein the activation and detection subsystem is removably couplable to the container and includes:

a means for causing a vibration and a means for receiving vibration data, the means for causing vibration consisting of a voice coil actuator or a piezoelectric or piezoresistive transducer, the means for receiving vibration data consisting of a vibration sensor, an accelerometer, a microphone, the piezoelectric or piezoresistive transducer, or an additional piezoelectric or piezoresistive transducer; and an elastic material configured to be operably coupled to the means for causing a vibration and/or the means for receiving vibration data, and to mechanically isolate the means for causing a vibration from the means for receiving vibration data, where the elastic material is not disposed between at least a portion of the means for receiving vibration data and the container.

2. The sensor system of claim 1, further comprising a temperature sensor, wherein the one or more processors are further configured to receive a temperature from the temperature sensor, and wherein the estimated mass or fill level is determined based on the vibration data and the temperature.

3. The sensor system of claim 1, wherein the activation and detection subsystem comprises a piezoelectric or piezoresistive transducer configured to cause the vibration, receive the vibration data, or both.

4. The sensor system of claim 3, wherein the one or more processors are further configured to, collectively, cause the piezoelectric or piezoresistive transducer to vibrate at a desired frequency.

5. The sensor system of claim 1, wherein the vibration data is acquired using a vibration sensor or a microphone.

6. The sensor system of claim 1, wherein the activation and detection subsystem comprises:

a voice coil actuator configured to cause the vibration; and a vibration sensor or a microphone configured to receive the vibration data.

7. The sensor system of claim 6, wherein the one or more processors are further configured to, collectively, cause the voice coil actuator to vibrate at a desired frequency or a range of desired frequencies, and wherein the vibration data is received from the vibration sensor or microphone.

8. The sensor system of claim 1, wherein the container is configured to exert a force on a contact surface of the activation and detection subsystem such that the elastic material is deformed.

9. The sensor system of claim 1, wherein power sent to the actuator is no more than 5 W.

10. The sensor system of claim 1, wherein the fluid consists of a gaseous material.

11. The sensor system of claim 1, wherein the fluid consists of a liquid.

12. The sensor system of claim 1, wherein the fluid consists of a liquid portion and a gaseous portion.

13. The sensor system of claim 1, further comprising a housing configured to cover all components of the activation and detection subsystem.

14. The sensor system of claim 1, wherein the activation and detection subsystem is coupled to a structure configured to hold or position the container such that the activation and detection subsystem is positioned at an external surface of the container.

15. The sensor system of claim 1, wherein the activation and detection subsystem communicates wirelessly or electrically with the one or more processors.

16. The sensor system of claim 1, wherein the one or more processors are further configured to, collectively, generate an alert or request a replacement container when the estimated mass or fill level is at or below a first predetermined threshold.

17. The sensor system of claim 1, wherein the one or more processors are further configured to, collectively, determine a rate at which the estimated mass or fill level within the container is changing.

18. The sensor system of claim 17, wherein the one or more processors are further configured to, collectively, estimate a target date and/or time at which the estimated mass or fill level within the container will be below a predetermined target threshold.

19. The sensor system of claim 18, wherein the one or more processors are further configured to, collectively, generate an alert or request a replacement container when the target date and/or time differs from a current date and/or time by less than a predetermined alerting threshold.

20. The sensor system of claim 17, wherein the one or more processors are further configured to, collectively, generate an alert when the rate at which the estimated mass or fill level within the container is changing differs from a predetermined expected rate.

21. The sensor system of claim 1, wherein the one or more processors are configured to determine the estimated mass or fill level based on one or more frequencies determined from the vibration data, a temperature, and information related to a design of the container.

22. The sensor system of claim 1, wherein the one or more processors are configured to determine the estimated mass or fill level when a temperature has not changed by more than a predetermined amount over a predetermined period of time.

23. The sensor system of claim 1, further comprising a pressure sensor configured to measure a pressure inside the container, the one or more processors configured to, collectively, receive a pressure from the pressure sensor.

24. The sensor system of claim 23, wherein the one or more processors are configured to determine the estimated mass or fill level based on one or more frequencies determined from the vibration data, a temperature, the pressure, and information related to a design of the container.

25. The sensor system of claim 1, wherein at least one of the one or more processors are disposed within a mobile phone, wherein the system further comprises a graphical user interface configured to be displayed on the mobile phone, the graphical user interface configured to display the estimated mass or fill level of the fluid in the container.

26. The sensor system of claim 1, wherein converting the vibration data into one or more frequencies is done using a fast Fourier transform.

27. The sensor system of claim 1, further comprising a stiff substrate defining a first opening and a second opening extending from a first surface to a second surface, and wherein the elastic material consists of a first elastic substrate and a second elastic substrate;

wherein the first elastic substrate is disposed at least partially within the first opening and disposed around a portion of the means for causing a vibration; and wherein the second elastic substrate is disposed at least partially within the second opening and disposed around a portion of the means for receiving vibration data.

\* \* \* \* \*